US008974727B2

(12) United States Patent
Abe et al.

(10) Patent No.: US 8,974,727 B2
(45) Date of Patent: Mar. 10, 2015

(54) METHOD FOR MANUFACTURING THREE-DIMENSIONALLY SHAPED OBJECT AND THREE-DIMENSIONALLY SHAPED OBJECT

(75) Inventors: Satoshi Abe, Osaka (JP); Yoshiyuki Uchinono, Osaka (JP); Isao Fuwa, Osaka (JP); Norio Yoshida, Nara (JP); Kazuho Morimoto, Kyoto (JP)

(73) Assignees: Panasonic Corporation, Osaka (JP); OPM Laboratory Co., Ltd, Kyoto (JP)

( * ) Notice: Subject to any disclaimer, the term of this patent is extended or adjusted under 35 U.S.C. 154(b) by 0 days.

(21) Appl. No.: 13/702,210

(22) PCT Filed: Jun. 9, 2011

(86) PCT No.: PCT/JP2011/063268
§ 371 (c)(1),
(2), (4) Date: Dec. 5, 2012

(87) PCT Pub. No.: WO2011/155567
PCT Pub. Date: Dec. 15, 2011

(65) Prior Publication Data
US 2013/0075575 A1 Mar. 28, 2013

(30) Foreign Application Priority Data
Jun. 9, 2010 (JP) ................................. 2010-132209

(51) Int. Cl.
*B22F 3/105* (2006.01)
*B29C 33/02* (2006.01)
(Continued)

(52) U.S. Cl.
CPC ............. *B29C 33/02* (2013.01); *B29C 35/0272* (2013.01); *B29C 67/0077* (2013.01);
(Continued)

(58) Field of Classification Search
CPC ............................. B22F 3/1055; B22F 3/1056
USPC ........................................................ 419/7, 9
See application file for complete search history.

(56) References Cited

U.S. PATENT DOCUMENTS 4,177,238 A 12/1979 Allen
5,132,143 A 7/1992 Deckard
(Continued)

FOREIGN PATENT DOCUMENTS

| CN | 1976800 | 6/2007 |
| CN | 1982039 | 6/2007 |

(Continued)

OTHER PUBLICATIONS

Translation of JP 2000-190086.*
(Continued)

*Primary Examiner* — George Wyszomierski
*Assistant Examiner* — Ngoclan T Mai
(74) *Attorney, Agent, or Firm* — Greenblum & Bernstein, P.L.C.

(57) ABSTRACT

There is provided a method for manufacturing a three-dimensional shaped object, the method comprising the repeated steps of: (i) forming a solidified layer by irradiating a predetermined portion of a powder layer with a light beam, thereby allowing a sintering of the powder in the predetermined portion or a melting and subsequent solidification thereof; and (ii) forming another solidified layer by newly forming a powder layer on the resulting solidified layer, followed by the irradiation of a predetermined portion of the powder layer with the light beam, wherein a heater element is disposed on the solidified layer during the repeated steps (i) and (ii), and thereby the heater element is situated within the three-dimensional shaped object.

7 Claims, 21 Drawing Sheets

(51) Int. Cl.
  *B29C 35/02* (2006.01)
  *B29C 67/00* (2006.01)
  *B29C 35/08* (2006.01)

(52) U.S. Cl.
  CPC ........... *B22F3/1055* (2013.01); *B29C 67/0092* (2013.01); *B29C 35/0805* (2013.01); *B22F 2003/1056* (2013.01)
  USPC .............................................. 419/7; 264/497

(56) References Cited

U.S. PATENT DOCUMENTS

| | | | |
|---|---|---|---|
| 5,316,580 | A | 5/1994 | Deckard |
| 5,460,761 | A | 10/1995 | Larsson |
| 5,542,611 | A | 8/1996 | Hendry |
| 5,597,589 | A | 1/1997 | Deckard |
| 5,616,294 | A | 4/1997 | Deckard |
| 5,639,070 | A | 6/1997 | Deckard |
| 6,589,471 | B1 * | 7/2003 | Khoshnevis ................. 264/497 |
| 6,656,409 | B1 * | 12/2003 | Keicher et al. ................ 264/401 |
| 6,682,688 | B1 | 1/2004 | Higashi et al. |
| 8,163,224 | B2 | 4/2012 | Higashi et al. |
| 2004/0173945 | A1 | 9/2004 | Khoshnevis |
| 2007/0196561 | A1 | 8/2007 | Philippi et al. |
| 2008/0111271 | A1 | 5/2008 | Khoshnevis |
| 2008/0277837 | A1 | 11/2008 | Liu et al. |
| 2009/0121393 | A1 | 5/2009 | Abe |
| 2009/0295039 | A1 | 12/2009 | Fruth et al. |
| 2010/0044547 | A1 | 2/2010 | Higashi et al. |
| 2012/0041586 | A1 | 2/2012 | Abe et al. |
| 2012/0093674 | A1 | 4/2012 | Abe et al. |
| 2012/0126457 | A1 | 5/2012 | Abe et al. |
| 2012/0251378 | A1 | 10/2012 | Abe et al. |
| 2012/0308781 | A1 | 12/2012 | Abe et al. |

FOREIGN PATENT DOCUMENTS

| | | | |
|---|---|---|---|
| CN | 101005939 | 7/2007 | |
| CN | 100336655 | 9/2007 | |
| CN | 101309766 | 11/2008 | |
| CN | 101653827 | 2/2010 | |
| JP | 01-502890 | 10/1989 | |
| JP | 06-0015681 | 1/1994 | |
| JP | 2000-73108 | 3/2000 | |
| JP | 2000-190086 | 7/2000 | |
| JP | 2000-190086 A * | 7/2000 | ............ B23K 26/00 |
| JP | 2002-322501 | 11/2002 | |
| JP | 2003-1715 | 1/2003 | |
| JP | 2003-305778 | 10/2003 | |
| JP | 2009-1900 | 1/2009 | |
| JP | 2010-47813 | 3/2010 | |
| JP | 2010-100883 | 5/2010 | |
| WO | 88/02677 | 4/1988 | |

OTHER PUBLICATIONS

International Preliminary Report on Patentability for PCT/JP2011/063268, mailed Jan. 15, 2013.
Search report from E.P.O., mail date is Apr. 7, 2014.
Japan Office Action, mail date is Apr. 8, 2014.
China Office Action, mail date is Mar. 26, 2014 along with an English language translation thereof.
International Search Report, mailed Sep. 13, 2011, in International Application No. PCT/JP2011/063269.
English Translation of International Preliminary Report on Patentability, mailed Jan. 24, 2013, in International Application No. PCT/JP2011/063269.
Chinese Office Action and Search Report, dated Mar. 26, 2014, in Chinese Application No. 201180027799.8, along with an English translation of the Search Report.
U.S. Appl. No. 13/702,214 to Satoshi Abe et al., filed Dec. 5, 2012.
(U.S. Appl. No. 13/702,214) Office action, mail date is Sep. 17, 2014.

* cited by examiner (a)

(b)

(a)

(b)

(a)

(b) [Top View]

[Section View]

[Top View]

[Section View]

(a)

(b)

(a)

(b)

(c)

[Top View]

[Section View]

[Top View]

[Section View]

(a)

(b)

[Top View]

[Section View]

[Top View]

[Section View]

Cooling water IN →
OUT ←

Cooling water

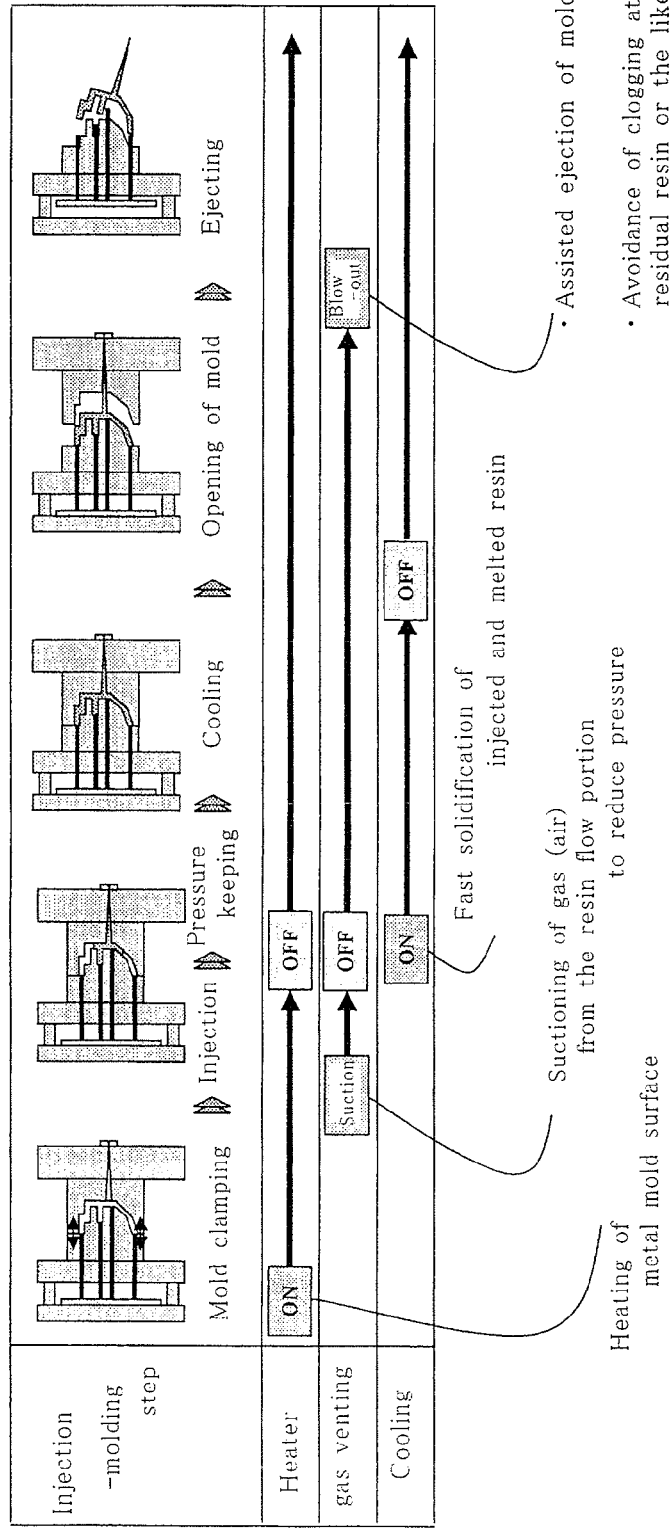

US 8,974,727 B2

METHOD FOR MANUFACTURING THREE-DIMENSIONALLY SHAPED OBJECT AND THREE-DIMENSIONALLY SHAPED OBJECT

TECHNICAL FIELD

The present invention relates to a method for manufacturing a three-dimensional shaped object, and also relates to a three-dimensional shaped object obtained thereby. More particularly, the present invention relates to a method for manufacturing a three-dimensional shaped object with a plurality of solidified layers stacked integrally by repeating the step of forming a solidified layer by irradiating a predetermined portion of a powder layer with a light beam, and also relates to the three-dimensional shaped object obtained by such manufacturing method.

BACKGROUND OF THE INVENTION

Heretofore, a method for manufacturing a three-dimensional shaped object by irradiating a powder with a light beam has been known (such method can be generally referred to as "selective laser sintering method"). Such method can produce a three-dimensional shaped object with a plurality of solidified layers stacked integrally by repeating the step (i) of forming a solidified layer by irradiating a predetermined portion of a powder layer with a light beam, thereby allowing sintering of the predetermined portion of the powder or melting and subsequent solidification thereof, and the step (ii) of forming another solidified layer by newly forming a powder layer on the resulting solidified layer, followed by similarly irradiating the powder layer with the light beam (see JP-T-01-502890 or JP-A-2000-73108). The three-dimensional shaped object thus obtained can be used as a metal mold in a case where inorganic powder materials such as a metal powder and a ceramic powder are used as the powder material. While on the other hand, the three-dimensional shaped object can be used as a model or replica in a case where organic powder materials such as a resin powder and a plastic powder are used as the powder material. This kind of technology makes it possible to produce the three-dimensional shaped object with a complicated contour shape in a short period of time.

By way of the case wherein a three-dimensional shaped object is manufactured on a base part, as shown in FIG. 1, a powder layer 22 with a predetermined thickness t1 is firstly formed on a base plate 21 (see FIG. 1(*a*)) and then a predetermined portion of a powder layer 22 is irradiated with a light beam to form a solidified layer 24 Then, a powder layer 22 is newly provided on the solidified layer 24 thus formed and is irradiated again with the light beam to form another solidified layer. In this way, the solidified layer is repeatedly formed, and thereby it is possible to obtain a three-dimensional shaped object with a plurality of solidified layers 24 stacked integrally (see FIG. 1(*b*)).

PATENT DOCUMENTS (Prior Art Patent Documents)

PATENT DOCUMENT 1: JP-T-01-502890
PATENT DOCUMENT 2: JP-A-2000-73108

DISCLOSURE OF THE INVENTION

Problems to be Solved by the Invention

The three-dimensional shaped object can be used as a metal mold. In an injection molding process performed by using the metal mold, two flows of the resin raw materials are generated within the metal mold cavity "in a case where the metal mold has more than two gates" or "in another case where the metal mold having only one gate is used, but such a cavity shape is provided that a flow is separated in the middle of an injecting route". A boundary at which the two flows of the resin raw materials join together is referred to as "weld (or weld line)". The weld can cause a disadvantageous effect. For example, a molded article is required to be coated in order to cover-up the weld, or the molded article becomes useless because of a poor appearance attributed to the weld. While not intending to be bound by any specific theory, the reason of the occurring of the weld is considered (1) that the resins cannot be joined together up to a satisfactory level since air contained in the resin flow or gas generated from the resin is compressed to be retained within the resin; and (2) that two flows of the resin materials are hard to be mingled when the two flows of resin materials join together since a tip end portion of the flowing resin is cooled down by being exposed to the air.

To prevent the weld from occurring, it is required to use a porous pin so as to carry out a venting by inserting a pin, or required to provide a steam circuit in the metal mold for heating the metal mold. However, such requirements make a configuration of the metal mold complex, thus making a designing of the metal mold difficult. This is because a temperature adjustment part and a venting part are required to be coupled together via bolts or the like in the metal mold, for example.

The inventors of the present invention have already invented "metal mold of a three-dimensional shaped object in which an embedded member including a temperature control block having a hollow portion running therethrough is provided" (see JP-A-2000-190086). However, as a result of intensive studies conducted by the inventors, it has been found that such a metal mold cannot sufficiently prevent the weld from occurring. This is because, in the metal mold of JP-A-2000-190086, a temperature adjustment element is provided in an internal space of the embedded member and the air trapped in the internal space has remarkably low heat conductivity.

Under these circumstances, the present invention has been created. That is, an object of the present invention is to provide a three-dimensional shaped object capable of being used as a metal mold wherein the shaped object is particularly suitable to prevent the occurring of the weld.

Means for Solving the Problems

In order to achieve the above object, the present invention provides a method for manufacturing a three-dimensional shaped object, the method comprising the repeated steps of:
(i) forming a solidified layer by irradiating a predetermined portion of a powder layer with a light beam, thereby allowing a sintering of the powder in the predetermined portion or a melting and subsequent solidification thereof; and
(ii) forming another solidified layer by newly forming a powder layer on the resulting solidified layer, followed by the irradiation of a predetermined portion of the powder layer with the light beam,
wherein a heater element is disposed on the solidified layer during the repeated steps (i) and (ii), and thereby the heater element is situated within the three-dimensional shaped object.

One of distinguishing features of the manufacturing method of the present invention is to provide a heater element within the three-dimensional shaped object in consideration of the use thereof. Specifically, according to the present invention, the heater element is disposed on the solidified layer at any point in time during the repeated steps (i) and (ii), followed by the continued formation of further solidified layer(s).

The term "heater element" as used herein substantially means a heating element capable of generating heat when it is energized, e.g., a coil.

The phrase "heater element is disposed on the solidified layer" as used herein substantially means that the heater element is installed on a partial region of the solidified layer having already been formed. In particular, the phrase means that the heater element is installed directly on the solidified layer.

Describing just for confirmation, the term "powder layer" as used in this description and claims means "metal powder layer made of a metal powder", for example. Also, the term "predetermined portion of a powder layer" substantially means a portion of a three-dimensional shaped object to be manufactured. Therefore, a powder existing in such predetermined portion is irradiated with a light beam, whereby, the powder undergoes a sintering or a melting and subsequent solidification thereof to form a shape of the three-dimensional shaped object. Furthermore, the term "solidified layer" substantially means "sintered layer" and the term "solidified density" substantially means "sintered density" in a case where the powder layer is a metal powder layer.

In one preferred embodiment, the forming of the powder layer and the solidified layer in the steps (i) and (ii) is performed on a supporting part for shaped object. This means that the powder layers and the solidified layers are formed on the supporting part for shaped object. In this case, it is preferred that a coil heater is used as the heater element, and the coil heater is disposed on the solidified layer via an opening of the supporting part. The term "supporting part for shaped object" as used herein substantially means a member which serves as a base of a shaped object to be manufactured. In a specifically suitable embodiment, the "supporting part for shaped object" refers to a plate member or a cuboid member disposed on a forming table (see the following description as to the "forming table"). A material of the supporting part for shaped object may be at least one selected from the group consisting of, but not limited thereto, steel, cemented carbide, high speed tool steel, alloy tool steel, stainless steel, and carbon steel for machine structural use.

In another preferred embodiment, the heater element is disposed in a groove formed in stacked layers of the solidified layers. In this case, it is preferred that the groove is subjected to a machining process, and the heater element is disposed on the machined surface of the groove.

Further, it is preferred that the groove is filled with a low-melting-point metal powder after disposing the heater element in the groove. In this case, the low-melting-point metal powder is irradiated with the light beam, and thereby the groove is occupied by a solidified portion formed from the low-melting-point metal powder. The irradiation of the low-melting-point metal powder is preferably performed with a light beam having a less energy than that of the light beam irradiation with respect to the powder layer. Preferably, an irradiation energy of the light beam with respect to the low-melting-point metal powder is rendered larger gradually as a powder portion to be irradiated is away from the heater element. Further, it is also preferred that, after the formation of the solidified portion, the machining process is performed with respect to the solidified portion and/or the solidified layer, and thereby a surface flatness thereof is provided.

The present invention also provides a three-dimensional shaped object obtained by the aforementioned manufacturing method. Such three-dimensional shaped object according to the present invention has a built-in heater element therewithin such that it is used as a metal mold. The various embodiments of the built-in heater element in the three-dimensional shaped object are exemplified as follows:

The built-in heater element is located in proximity to a cavity region where a raw resin material which is introduced into a cavity of the metal mold finally or resultantly reaches;

The built-in heater element is located in proximity to a cavity region where a thin part of molded article to be formed is positioned in the metal mold; and The built-in heater element is located in proximity to a gate portion of the metal mold.

Effect of the Invention

In accordance with the manufacturing method of the present invention, the heater element can be suitably embedded in the shaped object while executing the selective laser sintering method. In particular, the heater element can be locally situated at a predetermined region of the shaped object with ease in consideration of a final use of the shaped object.

When such a case is assumed that the three-dimensional shaped object is used as a metal mold, the heater element can be situated only near a region where the "weld phenomenon" may occur, and thereby the occurring of the weld can be effectively prevented during the resin molding process. To the contrary, in the conventional metal mold, a fluid heating medium is typically caused to flow in a hollow fluid path such that it passes through an inside of the three-dimensional shaped object, and thus the metal mold tends to be heated entirely due to the routing of the hollow fluid path, i.e., the metal mold is not heated selectively only for a required local region (e.g., a point where the weld may appear). In the conventional metal mold, on the assumption of a case of providing a heating element on the local region, it is required for the metal mold to be composed of two pieces of members such as a core side member and a cavity side member. Further, it is required that the heating element is disposed on one of the above described members and thereafter the member is covered by the other one of the above described members, resulting in being fixed to each other via a fastener member. Thus, such configuration requires a large number of parts and invites a complexity in the configuration. To solve the above described problem, the present invention provides the metal mold characterized in that the number of members of the heater would not increase since the heater element is disposed on the solidified layer on the way of the sequential forming process, that an installation region for installing the heater element is less limited, and that the heater element can be suitably situated on a desirable local region (i.e., since installation region of the heater element has less limitation, a venting part and a cooling pipe can be combined in an suitable manner and thus the weld phenomenon can be prevented from occurring in more effective manner).

The three-dimensional shaped object of the present invention can be suitably used as a metal mold. Specifically, the heat generation element is provided only in the desired local region such that it is in a direct contact with the body material of the metal mold, so that the metal mold having desirable features in terms of "temperature control efficiency" and "responsiveness" is realized. It is also considered that, since installation region where the heater element is installed has less limitation and thus the venting part (degassing part) and the cooling pipe can also be provided in desired regions, the metal mold having the desirable "temperature control efficiency" and "responsiveness" is realized.

BRIEF DESCRIPTION OF THE DRAWINGS

FIGS. 7(a) to 7(c) are schematic views showing a general concept of the present invention wherein FIG. 7(a) illustrates an embodiment where the heater element is disposed, FIG. 7(b) illustrates an embodiment at a point in time after the disposing of the heater element, and FIG. 7(c) illustrates an embodiment wherein the stacking of layers has been completed.

FIG. 14(b) illustrates how the solidified portion is formed in a batch manner by irradiating a light beam; and FIG. 14(c) illustrates how the solidified portion with a plurality of layers stacked one another is formed.)

FIG. 23 is a view illustrating an operation of the resin molding process using the metal mold according to the present invention.

EXPLANATION OF REFERENCE NUMERALS

Figure 1:
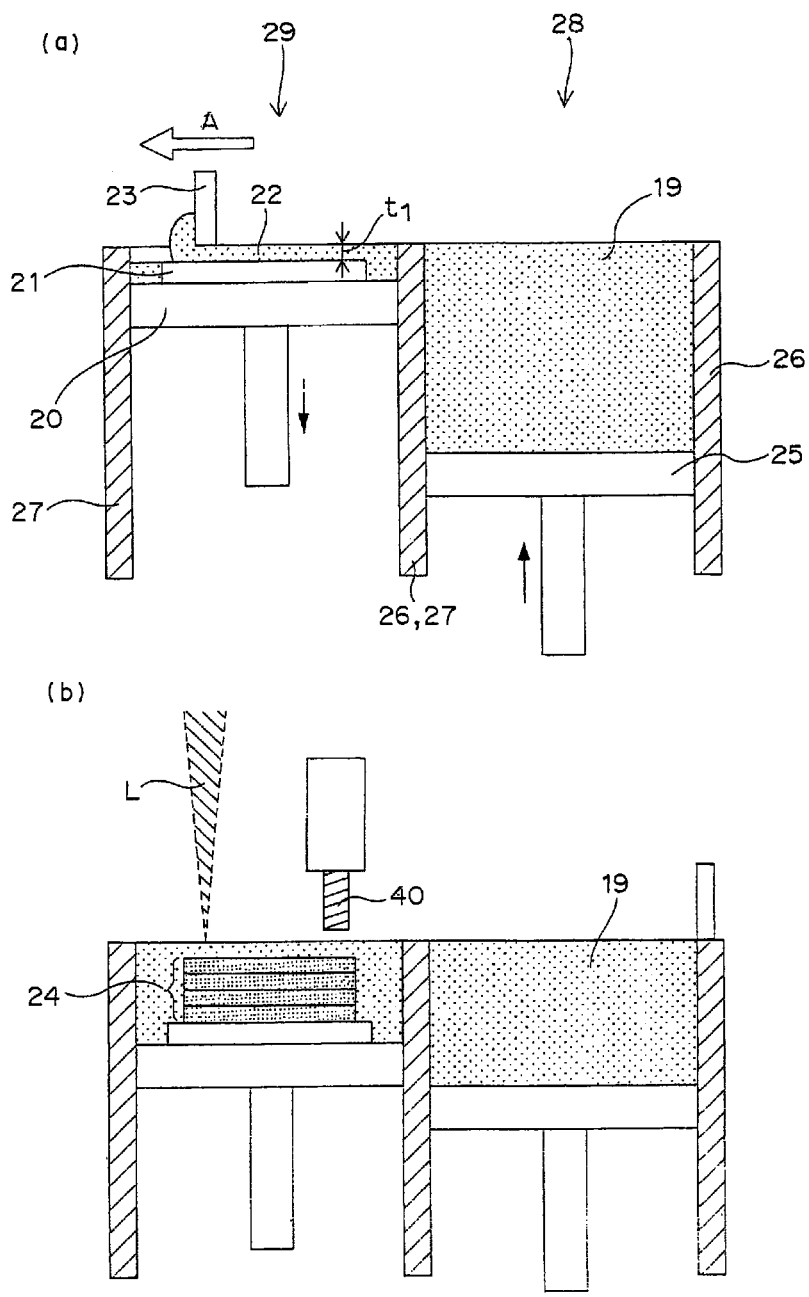
FIGS. 1(a) and 1(b) are sectional views schematically showing operations of a laser-sintering/machining hybrid machine.

1 Laser-sintering/machining hybrid machine
2 Powder layer forming means
3 Light-beam irradiation means
4 Machining means
8 Fume
19 Powder/powder layer (e.g., metal powder/metal powder layer)
19' Low-melting-point metal powder/low-melting-point metal powder layer
20 Forming table
21 Supporting part for shaped object
22 Powder layer (e.g., metal powder layer or resin powder layer)
22' Residual metal powder
23 Squeegee blade
24 Solidified layer (e.g., sintered layer) or three-dimensional shaped object obtained therefrom
24b Porous sintered portion
24c Reinforcing beam member
24d Pipe-shaped path
24d' Pipe-shaped pat
24A Upper surface of solidified layer
25 Powder table
26 Wall of storage tank for powder material
27 Wall of forming tank
28 Storage tank for powder material
29 Forming tank
30 Light beam generator
31 Galvanometer mirror
40 Milling head
41 X-Y actuator
50 Chamber
52 Window or lens for transmission of light
60 Suction machine
70 Heater element
70a Heat generation portion of coil heater
70b Actuationg portion of coil heater
80 Groove formed in the solidified layers
80A Upper surface of groove
80a Solidified portion occupying groove
80b Porous solidified portion
80c Solidified portion formed from low-melting-point metal powder
90a, 90b Opening of supporting part for shaped object, and opening of solidified layers
L Light beam

MODES FOR CARRYING OUT THE INVENTION

The present invention will be described in more detail with reference to the accompanying drawings.

[Selective Laser Sintering Method]

Figure 2:
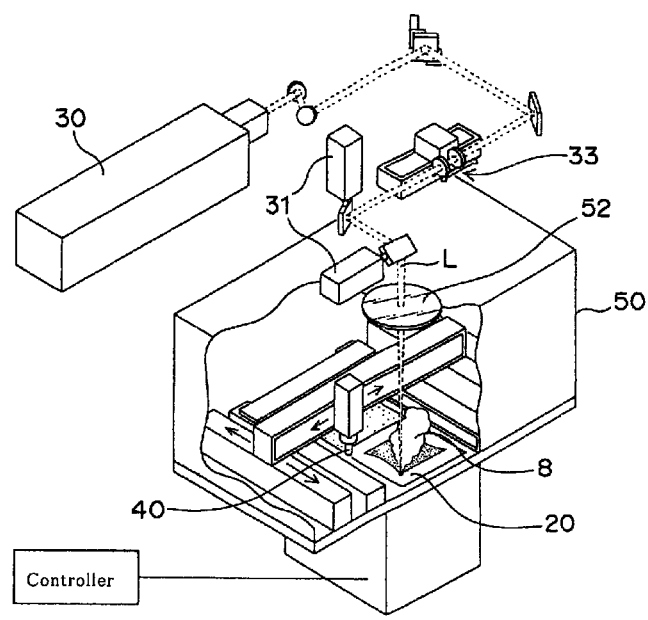
FIGS. 2(a) and 2(b) are perspective views schematically illustrating a device for performing a laser sintering (i.e., selective laser sintering method) wherein FIG. 2(a) especially shows a hybrid device with a machining mechanism, and FIG. 2(b) especially shows a device with no machining mechanism.
Figure 2:
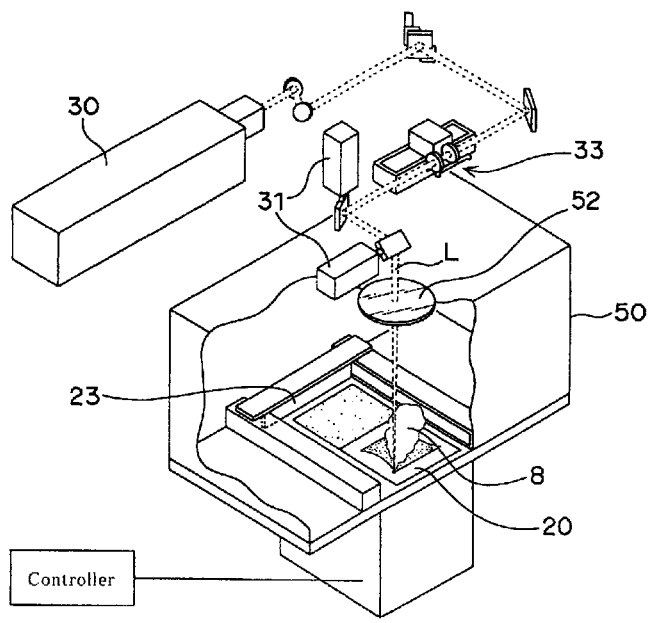
Figure 3:
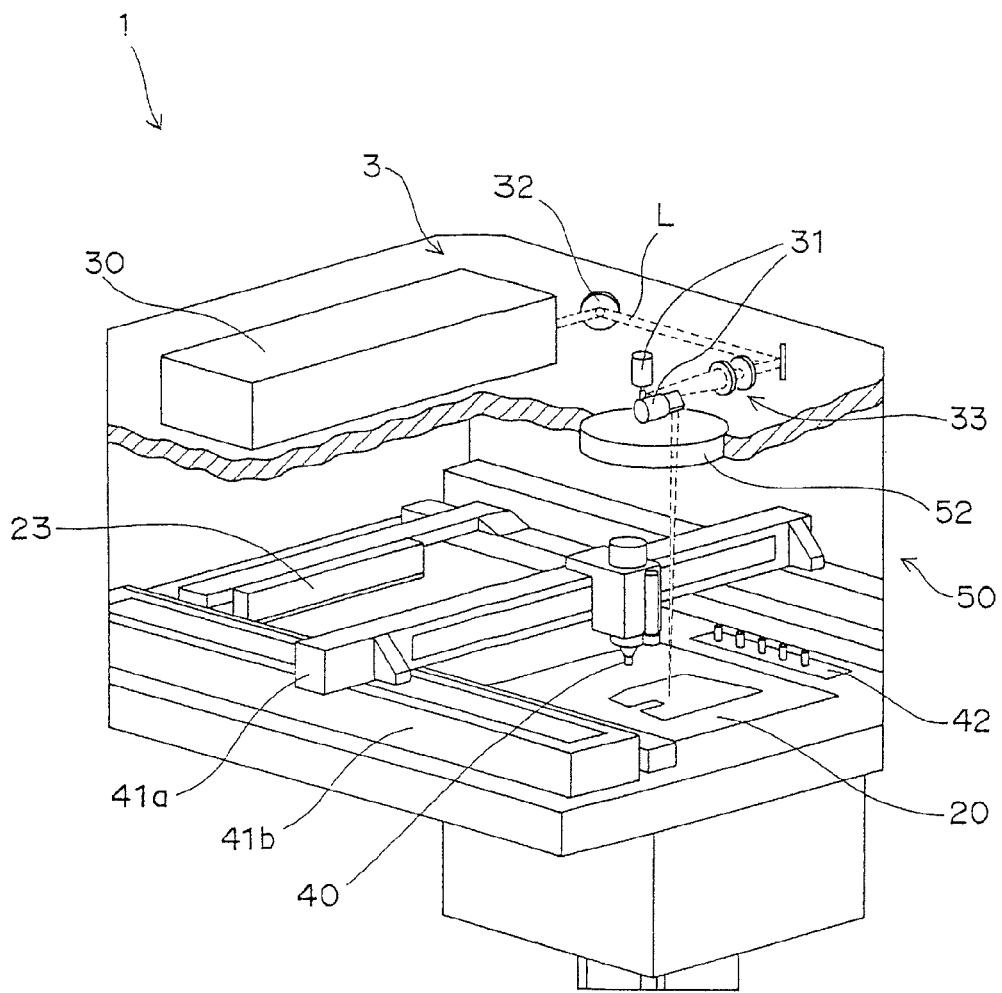
FIG. 3 is a perspective view schematically showing an embodiment in which a selective laser sintering method is carried out.
Figure 4:
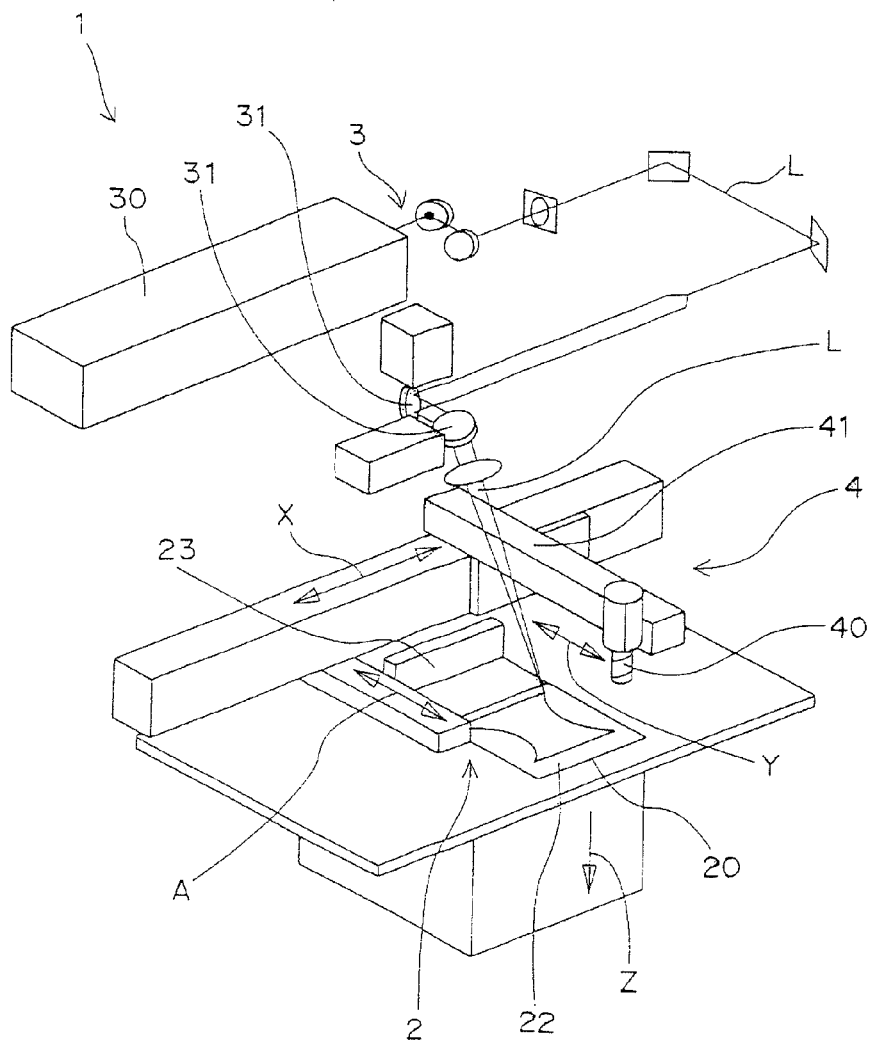
FIG. 4 is a perspective view schematically showing a constitution of a laser-sintering/machining hybrid machine by which a selective laser sintering method is carried out.

First, a selective laser sintering method, on which the manufacturing method of the present invention is based, will be described. For convenience, the selective laser sintering method, which will be described, is one where powder material is supplied from a storage tank therefor, followed by being flattened by means of a squeegee blade to form a powder layer therefrom. Moreover, by way of example, the selective laser sintering method wherein a machining process is additionally carried out with respect to the shaped object (i.e., the method embodiment shown in FIG. 2(a), not FIG. 2(b)) will be described. FIGS. 1, 3 and 4 show functions and constitutions, which enable execution of the selective laser sintering method, of a metal laser sintering hybrid milling machine. The laser-sintering/milling hybrid machine 1 is mainly provided with a "powder layer forming means 2 for forming a powder layer by providing a powder such as a metal powder or a resin powder in a predetermined thickness"; a "forming table 20 which is capable of vertically elevating/descending by cylinder drive in a forming tank 29 whose outer periphery is surrounded with a wall 27"; a "base plate for shaped object 21 which is disposed on the forming table 20 and serves as a platform of a shaped object"; a "light-beam irradiation means 3 for irradiating a desired position with an emitted light beam L"; and a "machining means 4 for milling the periphery of a shaped object". As shown in FIG. 1, the powder layer forming means 2 is mainly composed of a "powder table 25 capable of vertically elevating/descending by cylinder drive in a storage tank for powder material 28 whose outer periphery is surrounded with a wall 26" and a "squeegee blade 23 for forming a powder layer 22 on a base plate for shaped object or forming table". As shown in FIG. 3 and FIG. 4, the light-beam irradiation means 3 is mainly composed of a "light beam generator 30 for emitting a light beam L" and a "galvanometer mirror 31 (scan optical system) for scanning a light beam L onto a powder layer 22". Optionally, the light-beam irradiation means 3 is equipped with a beam shape correcting means for correcting a shape of a light beam spot (e.g., a means composed of a pair of cylindrical lens and a rotation drive mechanism for rotating the lens around a shaft line of the light beam) and fθ lens. The machining means 4 is mainly composed of a "milling head 40 for milling the periphery of a shaped object" and an "X-Y actuator 41 (41a, 41b) for driving the milling head 40 to move toward the position to be milled" (see FIG. 3 and FIG. 4).

Figure 5:
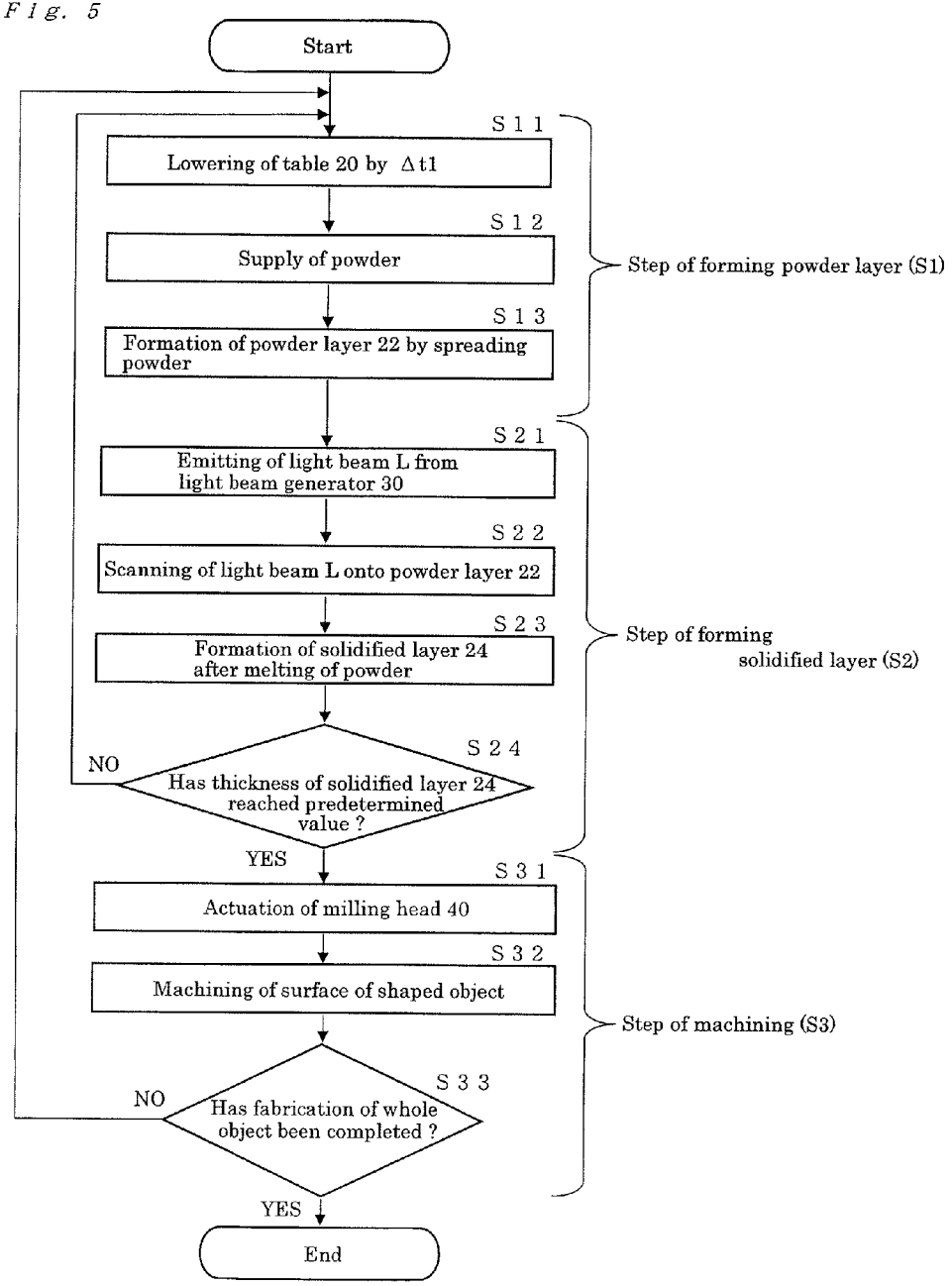
FIG. 5 is a flow chart of operations of a laser-sintering/machining hybrid machine.
Figure 6:
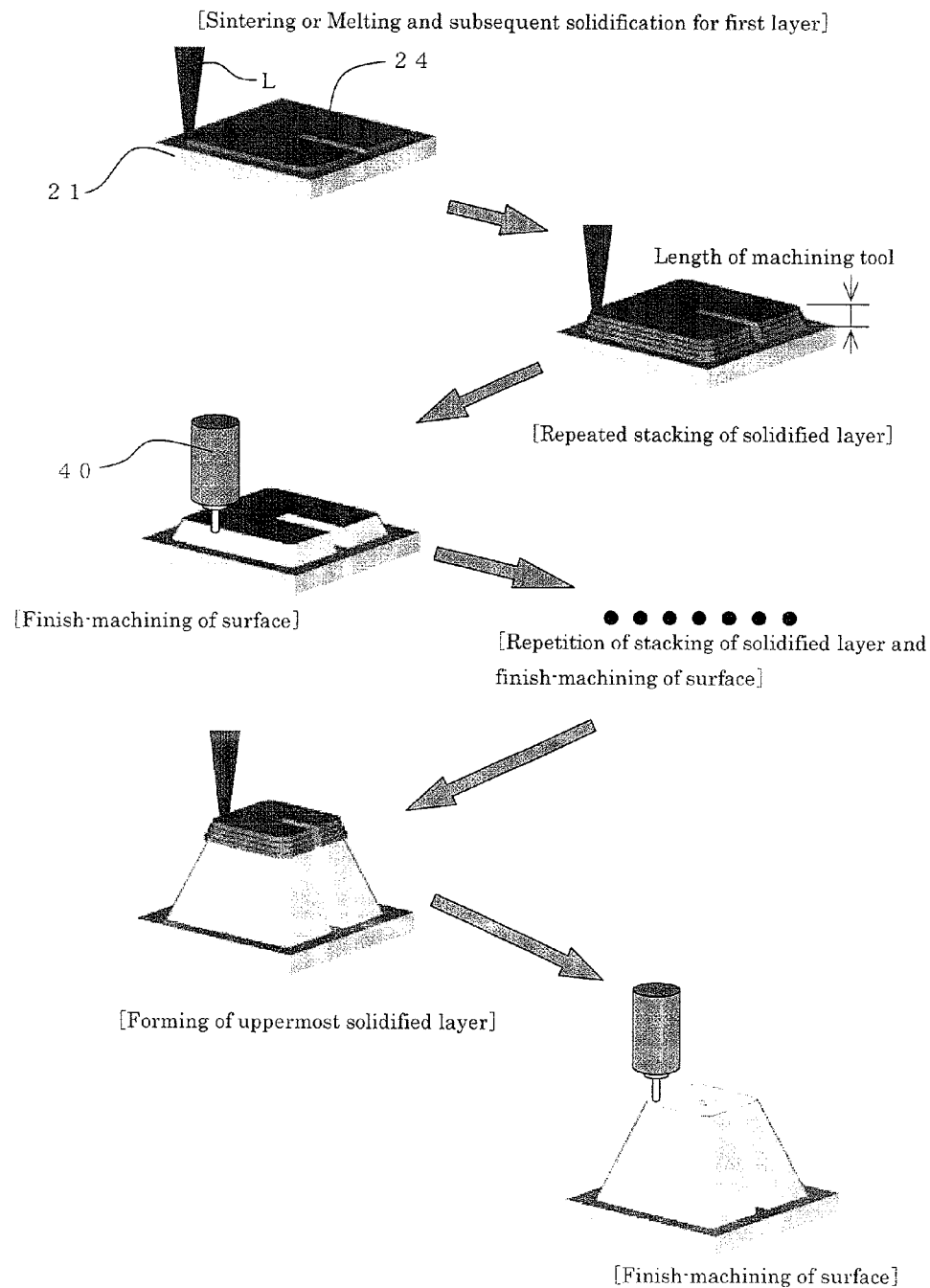
FIG. 6 is a schematic view showing a laser-sintering/machining hybrid process over time.

Operations of the metal laser sintering hybrid milling machine 1 will be described in detail with reference to FIG. 1, FIG. 5 and FIG. 6. FIG. 5 shows a general operation flow of a metal laser sintering hybrid milling machine. FIG. 6 schematically and simply shows a laser-sintering/machining hybrid process.

The operations of the metal laser sintering hybrid milling machine are mainly composed of a powder layer forming step (S1) of forming a powder layer 22; a solidified layer forming step (S2) of irradiating the powder layer 22 with a light beam L to form a solidified layer 24; and a machining step (S3) of milling a surface of a shaped object. In the powder layer forming step (S1), first, the forming table 20 is descended by $\Delta t1$ (S11). Subsequently, a powder table 25 is elevated by $\Delta t1$, and thereafter the squeegee blade 23 is driven to move in the direction of arrow "A" as shown in FIG. 1(a). Whereby, a powder (e.g., an "iron powder having a mean particle diameter of about 5 μm to 100 μm") placed on the powder table 25 is spread to form a powder layer 22 in a predetermined thickness $\Delta t1$ (S13), while being transferred onto the base plate 21 (S12). Following this step, the solidified layer forming step (S2) is performed. In this the solidified layer forming step, a light beam L (e.g., carbon dioxide gas laser (500 W), Nd:YAG laser (500 W), fiber laser (500 W) or ultraviolet light) is emitted from the light beam generator 30 (S21) and then a light beam L is scanned onto a desired position of the powder layer 22 by means of the galvanometer mirror 31 (S22). The scanned light beam can cause the powder to be melted and solidified, resulting in a formation of the solidified layer 24 integrated with the base plate 21 (S23). There is not limitation on transmission of the light beam in air, and the light beam may also be transmitted through an optical fiber or the like.

The powder layer forming step (S1) and the solidified layer forming step (S2) are repeatedly performed until the thickness of the stacked layers 24 reaches such a predetermined value that is obtained based on a tool length of the milling head 40 (see FIG. 1(b)). Upon a sintering of the powder or a melting and subsequent solidification of the powder, the newly stacked solidified layer is integrated with the lower solidified layer which has already been formed.

When the thickness of the stacked solidified layers 24 reaches a predetermined thickness, the machining step (S3) is initiated. In the embodiments as shown in FIG. 1 and FIG. 6, the milling head 40 is actuated to initiate execution of the machining step (S31). For example, in a case where the tool (ball end mill) of the milling head 40 has a diameter of 1 mm and an effective milling length of 3 mm, a milling in a depth of 3 mm can be performed. Therefore, when $\Delta t1$ is 0.05 mm, the milling head 40 is actuated when sixty solidified layers are formed. The milling head 40 is moved in X and Y directions by means of the X-Y actuator 41 (41a, 41b) and the shaped object composed of stacked solidified layers 24 is subjected to the surface machining (S32). When the entire three-dimensional shaped object has not yet been manufactured, the step returns to the powder layer forming step (S1). Thereafter, the steps S1 through S3 are repeatedly performed to further stack the solidified layers 24, and thereby making it possible to manufacture the desired three-dimensional shaped object (see FIG. 6).

An irradiation path of the light beam L in the solidified layer forming step (S2) and a milling path in the machining step (S3) are determined in advance using 3-D CAD data. In this case, the machining path is determined by applying contour line processing. For example, in the solidified layer forming step (S2), the contour shape data of each of sliced sections, which are regularly-pitched (e.g., 0.05 mm pitch when $\Delta t1$ is 0.05 mm) sliced sections of STL data produced from a 3-D CAD model, are used.

[Manufacturing Method of the Present Invention]

Figure 7:
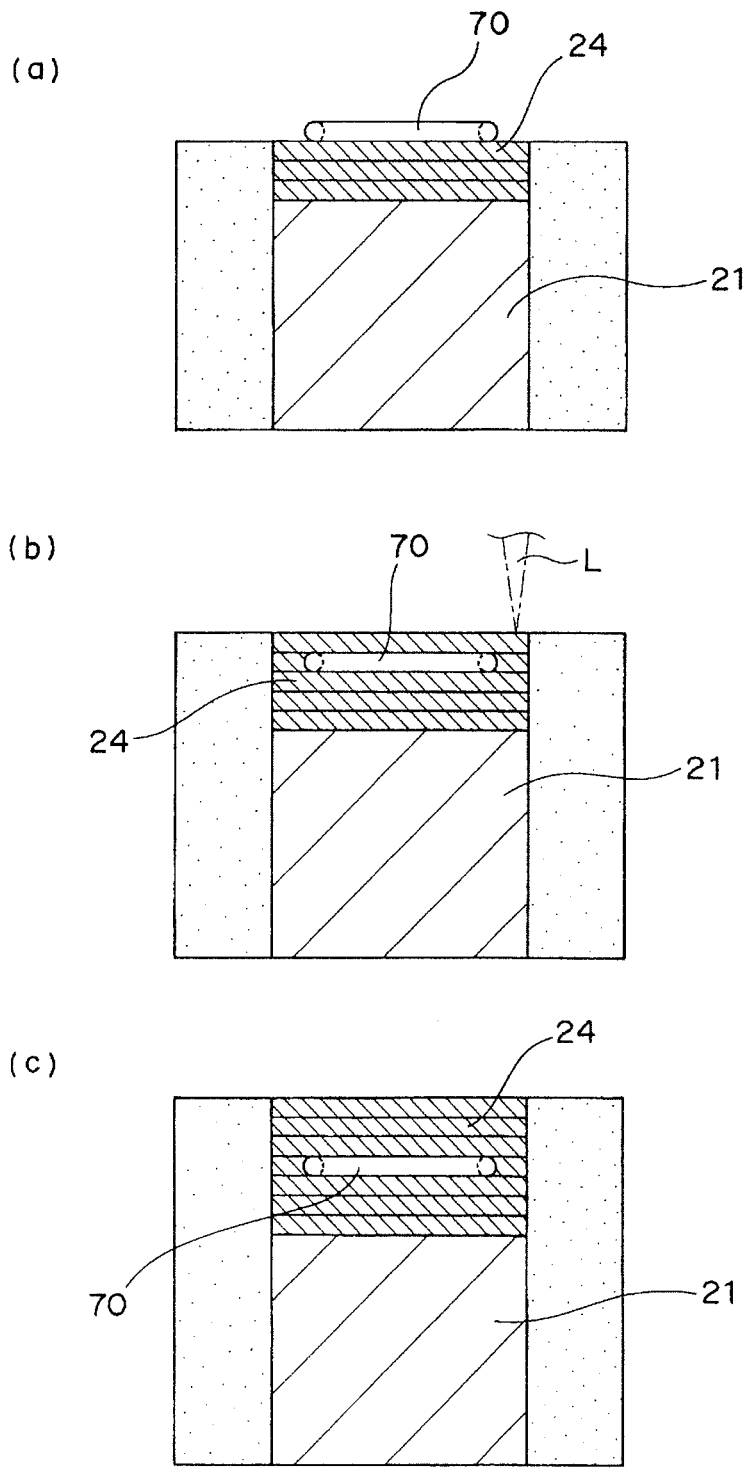
Figure 8:
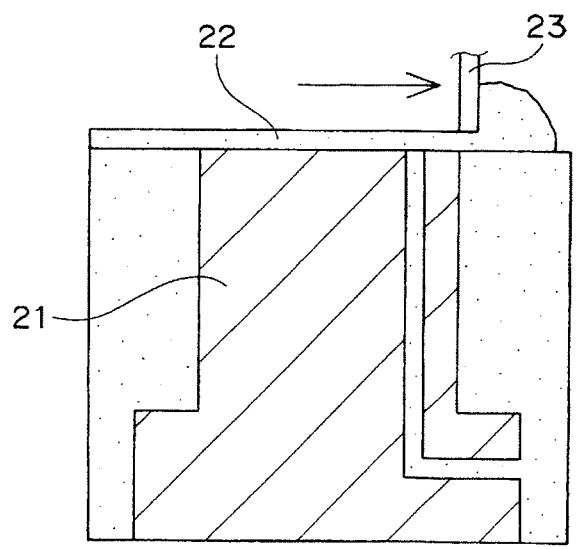
FIGS. 8(a) and 8(b) are schematic view illustrating a process in the manufacturing method of the present invention (at a point in time before the heater element is disposed).
Figure 8:
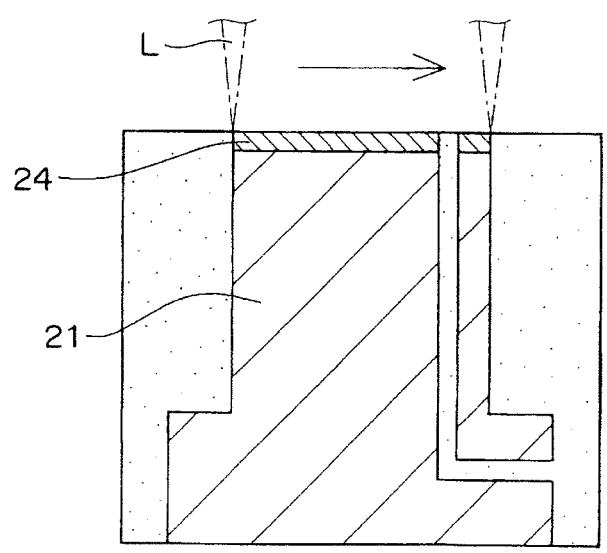
Figure 9:
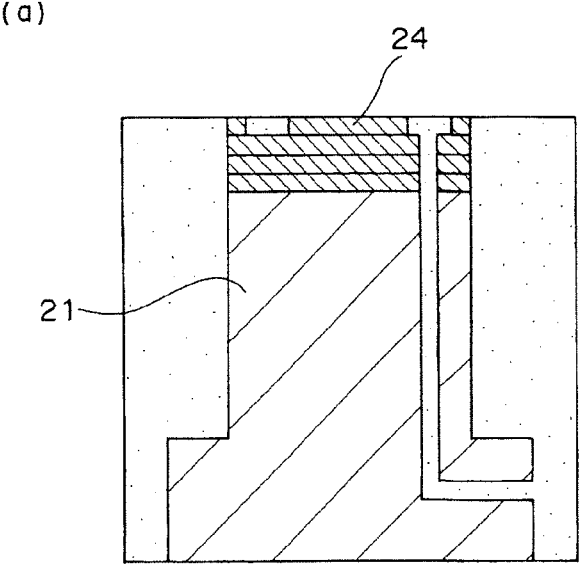
FIGS. 9(a) and 9(b) are schematic view illustrating a process in the manufacturing method of the present invention (at a point in time upon the disposition of the heater element).
Figure 9:
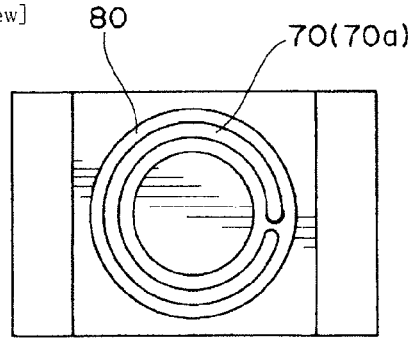
Figure 9:
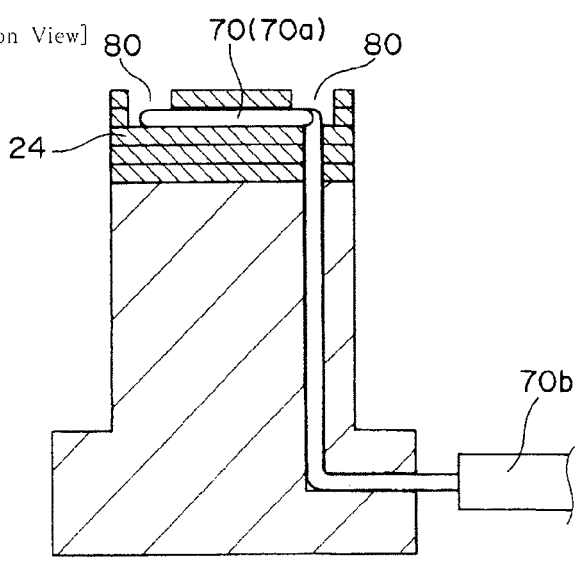

The present invention is particularly characterized by a step performed during the above described selective laser sintering method. In other words, the present invention is characterized in that a heater element 70 is disposed on the solidified layer 24 while the solidified layers are repeatedly formed (see, FIGS. 7(a) through 7(c)). According to the present invention, the heater element can be situated anywhere in the stacked solidified layers. This means that the heater element can be installed at a desired position within the manufactured three-dimensional shaped object. Thus the obtained three-dimensional shaped object can be used as a metal mold for a resin molding. The heater element can be locally situated in the metal mold so as to be directly contacted with the body material of the metal mold, which making it possible to more effectively prevent an occurring of the weld phenomenon.

The manufacturing method of the present invention will be described below over time with reference to FIGS. 8 through 13. The metal powder used in the present invention may be a powder containing an iron based powder as a main component, and may be a powder which further contains at least one kind powder selected from the group consisting of a nickel powder, a nickel based alloy powder, a copper powder, a copper based alloy powder and a graphite powder in some cases. Examples of the metal powder include a metal powder in which the proportion of an iron based powder having a mean particle diameter of about 20 μm is 60 to 90% by weight, the proportion of both or either of a nickel powder and a nickel based alloy powder is 5 to 35% by weight, the proportion of both or either of a copper powder and/or a copper based alloy powder is 5 to 15% by weight, and the proportion of a graphite powder is 0.2 to 0.8% by weight. The metal powder is not particularly limited to the iron based powder, but copper based powder or aluminum powder may be used. Moreover, plastic powder or ceramic powder may also be used as long as the three-dimensional shaped object is used not as a metal mold, but for any other purpose.

In carrying out the present invention, as illustrated in FIG. 8(a), a metal powder layer 22 is firstly formed on "supporting part for shaped object 21" by using a squeegee blade 23, for example. Subsequently, as illustrated in FIG. 8(b), the metal powder layer 22 is irradiated with a light beam L to be formed into a sintered layer 24. The metal powder layer 22 and the sintered layer 24 can be made into any thicknesses; however, a preferable thickness thereof may be for example in the approximate range of 0.02 mm to 0.5 mm, more preferably in the approximate range of 0.02 mm and 0.2 mm. The repeated formation of the sintered layer 24 (see, FIG. 9(a)) leads to a fabrication of a shaped object. According to the present invention, the repeated formation of the sintered layer 24 is stopped once at a certain point in time. Thereafter, as illustrated in FIG. 9(b), the heater element 70 is disposed on the solidified layers 24 which have been already formed.

A preferable example of the heater element 70 includes, but not limited to, a coil heater. The term "coil heater" here substantially means a heater element having a flexible heat generation portion that can be coiled. According to the present invention, it is preferred that a heat generation portion 70a of the coil heater 70 is disposed on the groove 80 formed in the stacked solidified layers, for example as illustrated in FIG. 9(b).

The groove 80, which is provided in the stacked solidified layer, can be formed through dividing a powder portion into a sub-portion where the light beam irradiation is performed and another sub-portion where no light beam irradiation is performed when the sintered layer 24 is formed. In other words, a powder region corresponding to the groove 80 in the metal powder layer 22 is not irradiated with the light beam but is left as it is and thereafter the powder remaining in such region is finally removed to form the groove 80.

Figure 10:
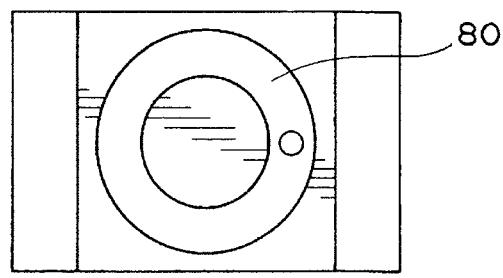
FIG. 10 schematically illustrates a groove formed in the stacked solidified layers.
Figure 10:
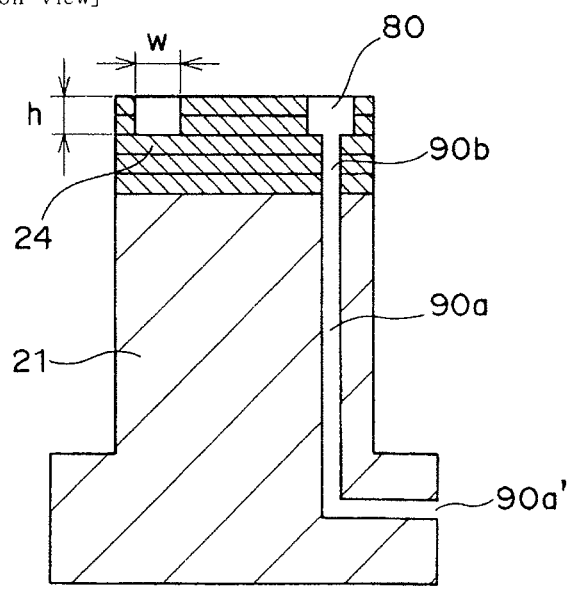

The groove 80 may be formed into any suitable shape according to a "shape of the coil element to be used" and "how the coil element is installed". In a case where the coil heater is used, the groove 80 may be formed into a ring-shaped groove or an annular shaped groove as illustrated in FIG. 10. In this regard, as it is illustrated in FIG. 9(b), it is preferred that the coil heater is disposed along the groove such that the flexible heat generation portion 70a is bent along the groove. In a case where the groove 80 is formed into the ring shaped groove or the annular shaped groove as illustrated in FIG. 10, a width "w" of the groove may be in the approximate range of 0.1 mm to 5 mm and a height "h" of the groove may be in the approximate range of 0.1 mm to 5 mm (see, FIG. 10).

Figure 11:
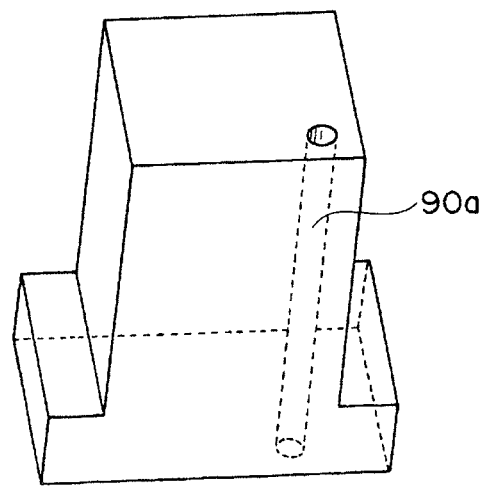
FIG. 11 is a perspective view schematically illustrating a supporting part for shaped object.

In a case where the coil heater 70 is provided in the groove 80, it is preferred that the coil heater 70 is disposed via openings 90a and 90b of the "supporting part for shaped object 21" and the "sintered layer 24" (see, FIG. 10 as to "openings"). Specifically, the heat generation portion 70a of the coil heater 70 is inserted from the opening 90a of "supporting part for shaped object 21" (more specifically, from a lower inlet 90a' of the opening) and further inserted into the opening 90b of the sintered layer 24. Consequently, the heat generation portion 70a of the coil heater 70 can be finally disposed in the groove from the lower side thereof. In the coil heater, the heat generation portion 70a is flexible and thus can be bent in its any orientation, so that the heat generation portion 70a can be suitably provided along the shape of the groove 80 even after passing through the openings 90a and 90b. In installation of such coil heater, "supporting part for shaped object 21" previously provided with the opening 90a can be used as illustrated in FIG. 11. For example, in a case where the "supporting part for shaped object 21" is made of metal, the opening 90a can be formed by performing a machining process such as drilling. The opening 90b of the sintered layer 24 can be formed in a similar manner to the case of forming of the groove 80. That is, the opening 90b of the sintered layer 24 can be formed through dividing a powder portion into a sub-portion where the light beam irradiation is performed and another sub-portion where no light beam irradiation is performed when the sintered layer 24 is formed. In other words, a powder region corresponding to the opening 90b in the metal powder layer 22 is not irradiated with the light beam but is left as it is and thereafter the powder remaining in such region is finally removed to form the opening 90b. It is preferred that the opening 90b of the sintered layer is formed so as to be in communication with both of the opening 90a of "supporting part for shaped object 21" and the groove 80 as illustrated in FIG. 10. This can facilitate a smooth disposing of the coil heater 70 via such openings.

Figure 12:
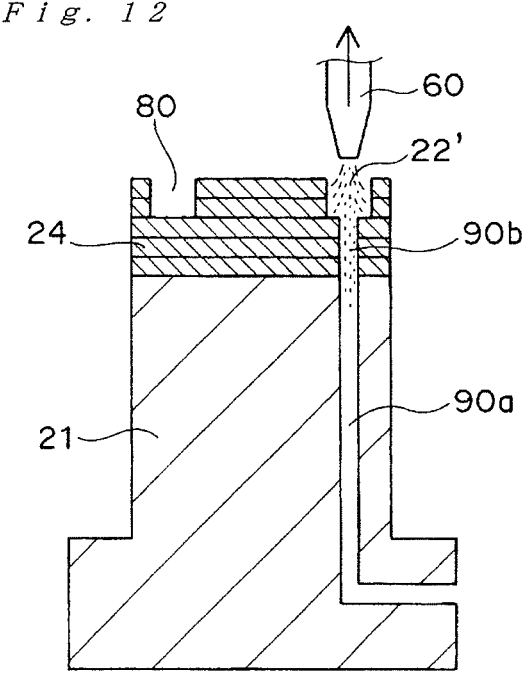
FIG. 12 schematically illustrates how the metal powder remaining in an opening is sucked out.
Figure 13:
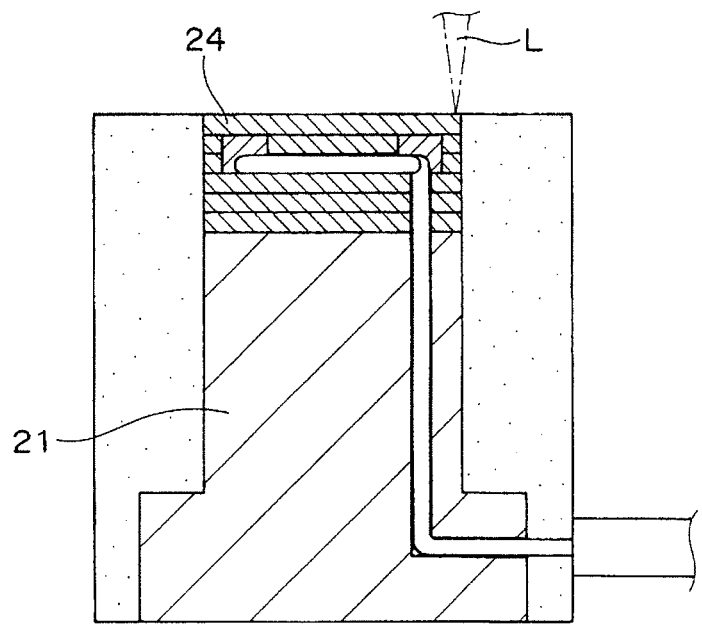
FIGS. 13(a) and 13(b) are schematic view illustrating a process in the manufacturing method of the present invention (at a point in time after the disposition of the heater element).
Figure 13:
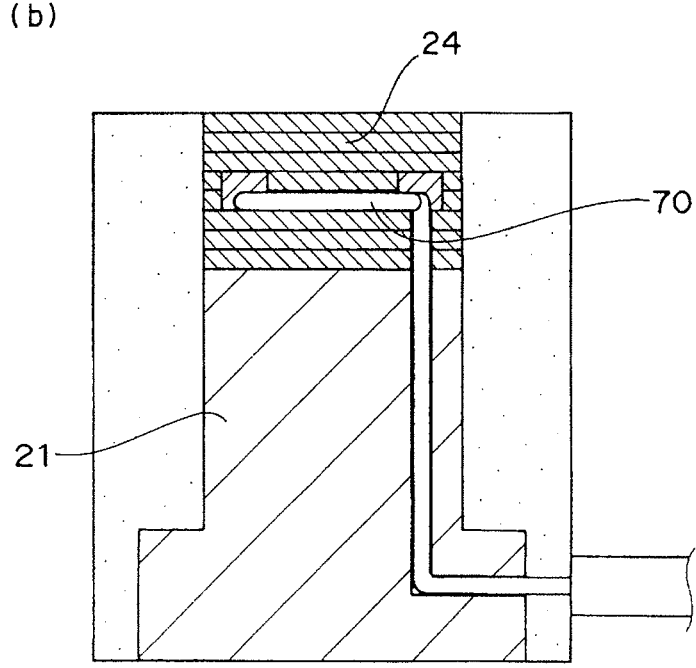

The disposing of the coil element 70 via the openings 90a and 90b may be performed after the "supporting part for shaped object" integrated with the sintered layer is temporary taken out from the powder tank. This can facilitate a removal of the metal powder clogged in the openings 90a and 90b. Upon the removal of the metal powder, as illustrated in FIG. 12, a suction machine 60 may be used as required in order to forcibly remove the metal powder 22 remaining in the openings 90a and 90b by use of suction.

After the heater element 70 is disposed on the groove 80, the further sintered layer 24 is started to be stacked again. In other words, the forming process of the metal powder layer and the irradiation process of the light beam thereto are repeated again (see, FIGS. 13(a) and 13(b)). More specifically, the groove 80 is firstly filled with the powder, followed by repetition of the "forming process of the metal powder layer by using the squeegee blade" and the "forming process of the sintered layer 24 by irradiating the light beam thereto" in a manner as described above. With such operation, there can be finally obtained the three-dimensional shaped object having the built-in heater element at a desired position therein.

Figure 14:
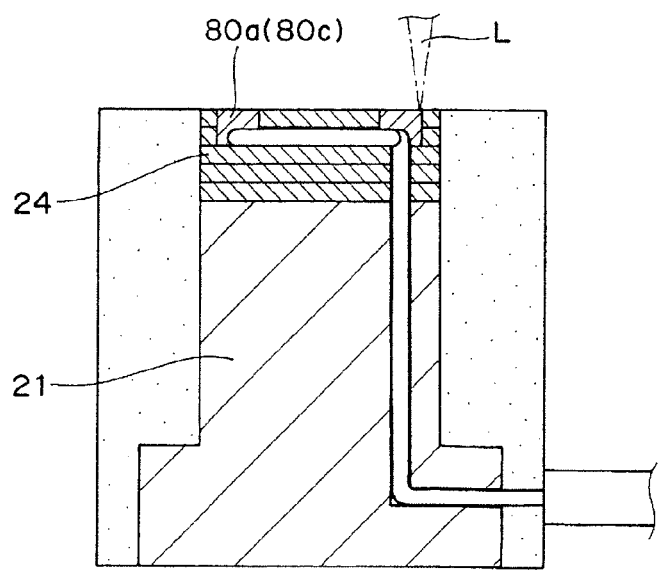
FIGS. 14(a) to 14(c) schematically illustrate how a solidified portion occupying a groove is formed (i.e., FIG. 14(a) is a conceptual view for forming the solidified portion.
Figure 14:
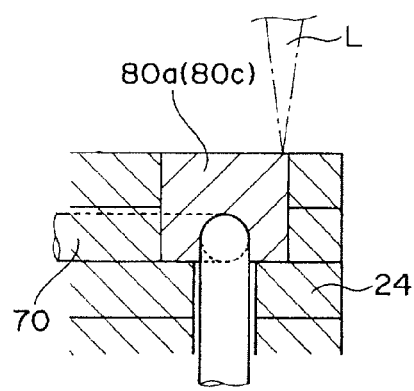
Figure 14:
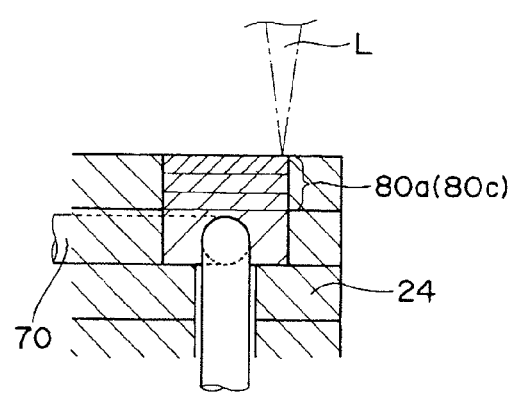

In order to suitably fill up the groove 80 after disposing the heater element, it is preferred that the metal powder is supplied in the groove by using, for example, the squeegee blade used for forming the metal powder layer, and then the supplied metal powder is irradiated with the light beam L (see, FIG. 14(a)). When the metal powder filled in the groove is irradiated with the light beam, the metal powder is solidified (i.e., the metal powder is sintered to thereby form the solidified portion 80a), resulting in filling up the groove 80 by the solidified portion 80a. In this regard, the metal powder filled in the groove may be irradiated with the light beam in a batch manner (FIG. 14(b)). Alternatively, such a process may also be employed that a plurality of layers made of the metal powder are formed layer by layer so as to be filled in the groove, and in the course thereof each of the plurality of layers is irradiated with the light beam (see, FIG. 14(c)).

The above described embodiments are mere typical examples encompassed within the applicable range of the present invention. Thus, the present invention is not limited to the above described embodiments, but various modifications thereof can be possible as follows:

(Machining Process of Groove)

Figure 15:
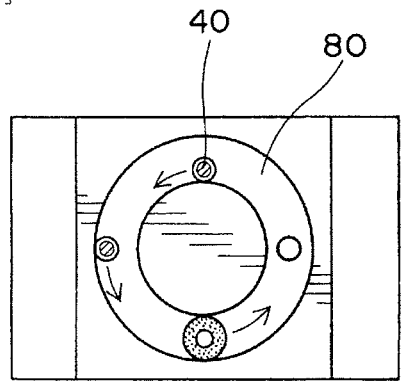
FIG. 15 schematically illustrates a state that the groove is subjected to a machining process.
Figure 15:
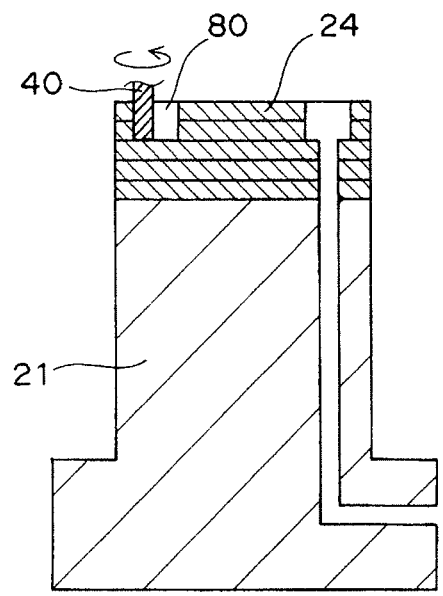

FIG. 15 illustrates how the machining process of the groove is performed. Here, prior to the disposal of the heater element on the groove formed in the solidified layers, the groove 80 is subjected to a machining process. This makes it possible to reduce a surface roughness, and thereby the disposed heater element can be adhered onto the groove tighter. The improvement of the adhesion of the heater element, i.e., the improvement of the contact between the heater element and a surface of the groove, enables an efficient conduction of heat from the heater element to the three-dimensional shaped object in the use application of the three-dimensional shaped object. The term "machining process" as used herein substantially means an operation of cutting the three-dimensional shaped object by using a tool, more specifically, an operation of eliminating the surface roughness of the three-dimensional shaped object.

Any suitable means can be used in the machining process as long as it can provide a surface cutting process. For example, the means for the machining process of the above described metal laser sintering hybrid milling machine can be used (e.g., see, FIG. 2(a)). In other words, the used machining means may be a numerical control (NC: Numerical Control) machine tool or those analogous thereto. More specifically, it is preferably a machining center (MC) whose milling tool (end mill) is automatically exchangeable. As the end mill, for example, a twin bladed ball end mill of a superhard material is mainly used. A square end mill, a radius end mill, a drill or the like may also be used as necessary.

The surface roughness of the groove can be reduced by subjecting the groove to a surface machining process. For example, a surface roughness Rz of the machined groove can be preferably 10 μm or less, more preferably 5 μm or less, and still more preferably 0.1 μm or less. The term "surface roughness Rz" used herein substantially means a roughness measure which is obtained by adding up "height up to the uppermost mountain peak" and "depth down to the valley portion" from an average line in a roughness profile (i.e., "cross-sectional profile of the groove surface").

(Embodiment of Formation of Porous Solidified Portion)

Figure 16:
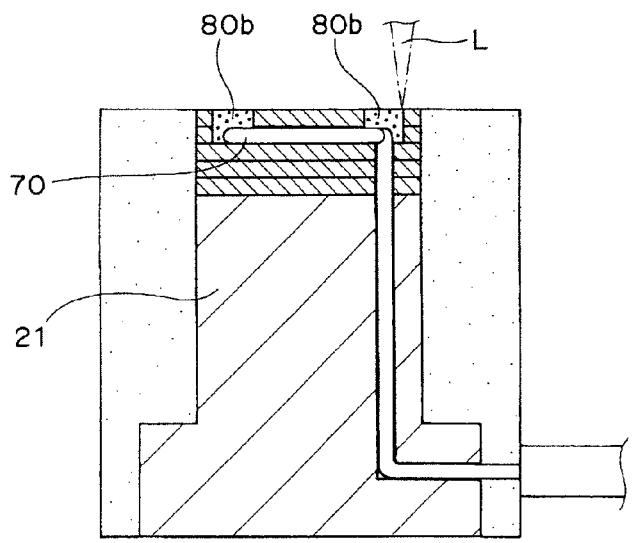
FIG. 16 schematically illustrates how a porous solidified portion is formed in the groove.

FIG. 16 illustrates a forming process of the "porous solidified portion". According to this embodiment, the groove 80 is filled with the metal powder and then the filled metal powder is irradiated with the light beam having a low energy, thereby the groove 80 is occupied by a porous solidified portion 80b (i.e., a "roughly sintered portion") formed from the metal powder. In other words, an output energy of the light beam to be irradiated onto the metal powder filled in the groove 80 is lowered so as to make a sintered density of the metal powder insufficient, thereby forming the solidified portion having the sintered density of 40% to 90%, for example. It should be recognized that the sintered density of the sintered layer portion 24 other than the low-density portion is in the range of 90% to 100%. The formation of the porous solidified portion contributes to an effective prevention of the damage of the heater element, the damage being attributed to the light beam irradiation. As used in this description and claims, the term "sintered density" substantially means a sintered sectional density (occupation ratio of a metallic material) determined by image processing of a sectional photograph of the shaped object. Image processing software for determining the sintered sectional density is Scion Image ver. 4.0.2 (freeware). In such case, it is possible to determine a sintered sectional density $\rho_s$ from the below-mentioned equation 1 by binarizing a sectional image into a sintered portion (white) and a vacancy portion (black), and then counting all picture element numbers $Px_{all}$ of the image and picture element number $Px_{white}$ of the sintered portion (white).

$$\rho_S = \frac{Px_{white}}{Px_{all}} \times 100 \; (\%) \qquad \text{[Equation 1]}$$

Figure 17:
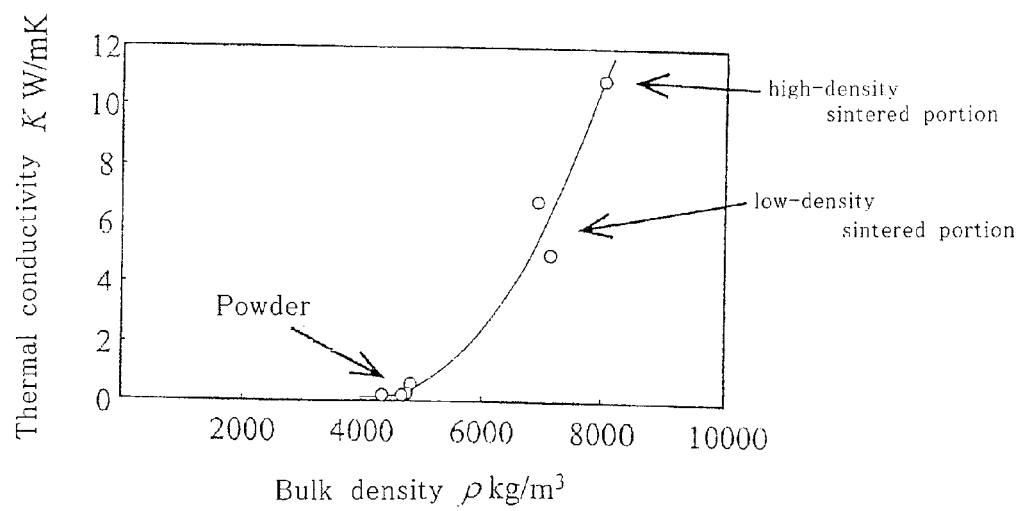
FIG. 17 is a graph illustrating a correlation between a sintered density (i.e., a bulk density) and thermal conductivity.

The inventors have conducted intensive studies and found that, even in a case where the porous solidified portion is formed, the heat conductivity of such portion is still high and thus an effective heat transfer from the heater element to the shaped object can be performed. This can be seen in FIG. 17, for example. It should be recognized that a solidified layer having the sintered density of about 40% to about 90% can correspond to a solidified layer having a "bulk density ρ" of 6500 to 7500 kg/m³ in a graph of FIG. 17. In other words, even in a case where the porous solidified portion is formed, the heat conductivity of the porous solidified portion would not be lowered, and thereby the three-dimensional shaped object finally obtained can be suitably used as the metal mold.

The porous solidified portion 80b can be formed by, in addition to (a) decreasing the output energy of the light beam, (b) increasing a scanning rate of the light beam, (c) enlarging a scanning pitch of the light beam, and (d) increasing a condensing diameter of the light beam. The aforementioned operations (a) to (d) may be performed alone, or performed in combination. Especially with respect to the aforementioned operation (a) for example, the porous solidified portion whose sintered density is about 70% to about 80% can be formed by adjusting an irradiation energy density E of the light beam in a range from about 2 J/mm² to about 3 J/mm². It should be noted that Energy density E=Laser output power (W)/(Scanning rate (mm/s)×Scanning pitch (mm)) wherein the manufacturing condition is as follows: Powder layer thickness: 0.05 mm, Laser; CO₂ Laser (Carbon dioxide laser), Spot diameter: 0.5 mm (the same is applied to the below description).

(Embodiment of Filling of Low-Melting Point Metal Powder)

According to this embodiment, the metal powder having a low melting point is used as the metal powder for filling the groove 80 after the disposal of the heater element. More specifically, referring to FIGS. 14(a) through 14(c), the groove 80 is filled with the metal powder having the low melting point, and thereafter the groove filled with the metal powder is irradiated with the light beam. As a result, a solidified portion 80c is formed from the low-melting point metal powder in the groove 80. The term "low-melting point" of "low-melting point metal powder" substantially means a melting point lower than that of the metal powder to be used for forming the solidified layer for the body of the three-dimensional shaped object. For example, the term "low-melting point" substantially means a melting point ranging from 100° C. to 1000° C. The low-melting point metal powder may be at least one selected from the group consisting of a copper alloy, an aluminum alloy, a tin-based alloy such as solder powder, and an indium-based alloy.

In a case where the low-melting point metal powder is used, the solidified portion 80c for filling up the groove 80 can be formed with the light beam having an energy lower than that for the formation of the sintered layer. This can prevent the heater element 70 from being damaged, such damage being attributed to the light beam irradiation. More specifically, the solidified portion 80c occupying the groove 80 can be formed by the light beam irradiation having less energy than that of the light beam irradiation for the formation of the sintered layer 24. The solidified portion 80c occupying the groove 80 can be formed by, in addition to (a) decreasing the output energy of the light beam, (b) increasing a scanning rate of the light beam, (c) enlarging a scanning pitch of the light beam, and (d) increasing a condensing diameter of the light beam. The aforementioned operations (a) to (d) may be performed alone, or performed in combination. Especially with respect to the aforementioned operation (a) for example, solidified portion 80c occupying the groove 80 can be formed by adjusting an irradiation energy density E of the light beam in a range from about 0.1 J/mm$^2$ to about 4 J/mm$^2$, whereas the normal sintered layer 24 can be formed by adjusting the irradiation energy density E of the light beam in a range from about 4 J/mm$^2$ to about 15 J/mm$^2$.

In a case where the low-melting point metal powder is used, it is preferred that an irradiation energy of the light beam with respect to the low-melting-point metal powder is rendered larger gradually as a powder portion to be irradiated is away from the heater element. More specifically, as illustrated in FIG. 14(c), in a case where a plurality of layers made of the low-melting point metal powder are provided in the groove and each of the plurality of layers is irradiated with the light beam layer by layer, it is preferred that an energy density E of the light beam is made higher for the upper layer. This makes it possible not only to further prevent the heater element from being damaged, such damage being attributed to the light beam irradiation, but also to effectively increase the heat conductivity of the solidified portion occupying the groove. Just as an example, in a case where the groove is filled with the low-melting point metal powder such that one through ten layers are stacked one another in the groove, the energy density E of the light beam irradiated to the lowermost layer is in the range of about 0.1 J/mm$^2$ to about 2 J/mm$^2$, the energy density E of the light beam irradiated to the uppermost layer is in the range of about 1 J/mm$^2$ to about 4 J/mm$^2$, and the energy density E may be raised gradually constantly (e.g., at an increment of about 0.2 J/mm$^2$ to about 0.5 J/mm$^2$) with respect to each of middle layers.

(Embodiment of Machining Process for Surface Grinding)

Figure 18:
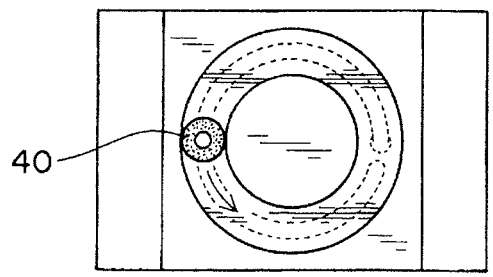
FIG. 18 schematically illustrates a machining process for surface grinding.
Figure 18:
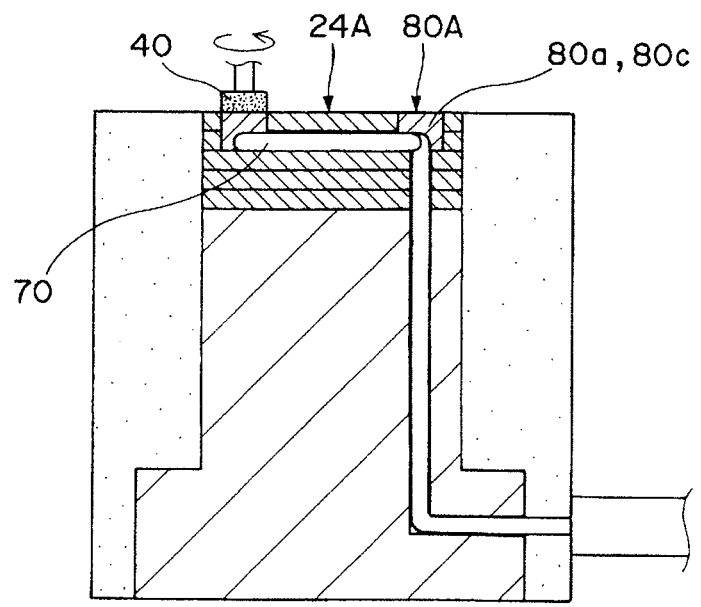

FIG. 18 illustrates how the machining process for surface grinding is performed. According to this embodiment, the solidified portions 80a and 80c occupying the groove 80 are formed from the metal powder or the low-melting point metal powder, and thereafter the machining process is performed so that an upper surface 80A of the solidified portion becomes flush with an upper surface 24A of the uppermost sintered layer. In other words, in a case where the solidified portion occupying the groove is formed, the sintered surface is roughened due to a locally different thickness of the powder layer, and thus the roughened surface is subjected to a flat finishing process until the surface flatness thereof can be obtained. A means for the machining process may be any suitable one as long as it can produce a flush surface i.e., a flat surface. For example, a means for machining process of the above described metal laser sintering hybrid milling machine can be employed. In other words, the machining means for producing a flat surface may be a numerical control (NC: Numerical Control) machine tool or those analogous thereto. More specifically, it is preferably a machining center (MC) whose milling tool (end mill) is automatically exchangeable. As the end mill, for example, a twin bladed ball end mill of a superhard material is mainly used. A square end mill, a radius end mill or the like may also be used as necessary.

The performing of the machining process so that the upper surface 80A of the solidified portion becomes flush with the upper surface 24A of the uppermost sintered layer can lead to a satisfactory formation of the powder layer after the installation of the heater element, making it possible to satisfactorily form the subsequent sintered layers.

(Embodiment of Forming Process of Venting Part)

Figure 19:
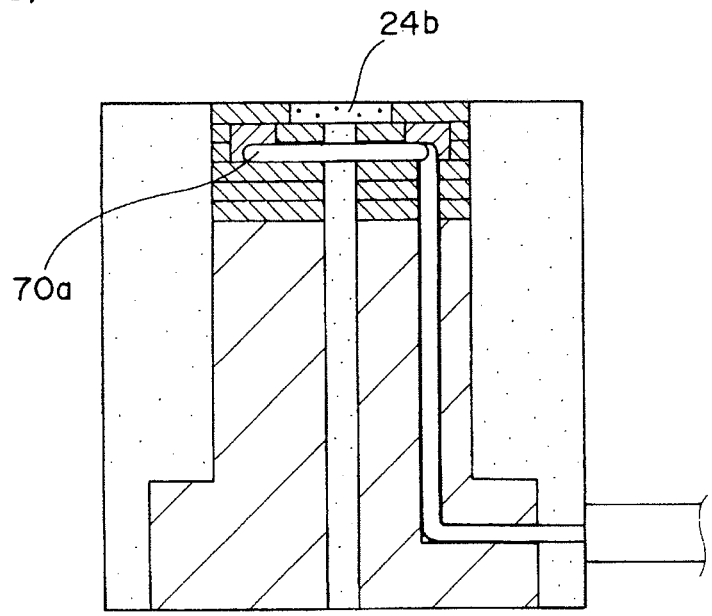
FIGS. 19(a) and 19(b) schematically illustrate a process for forming a venting part (degassing part).
Figure 19:
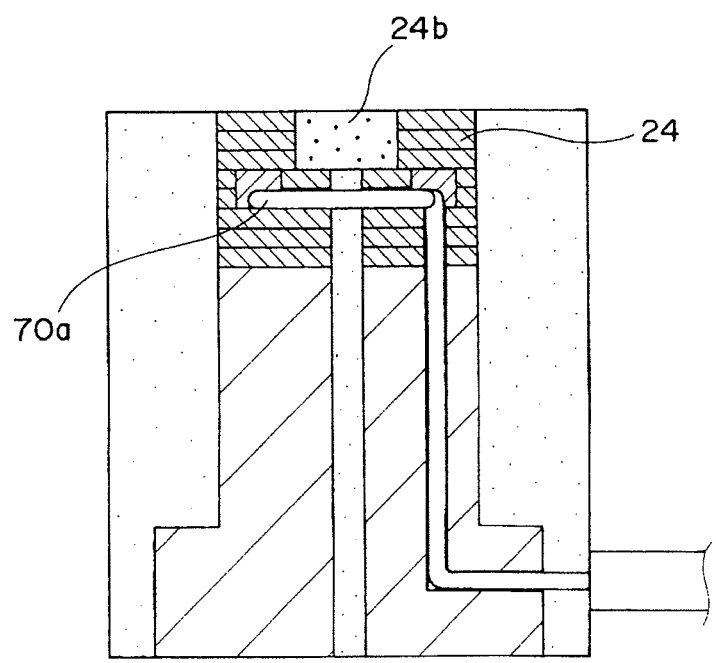
Figure 20:
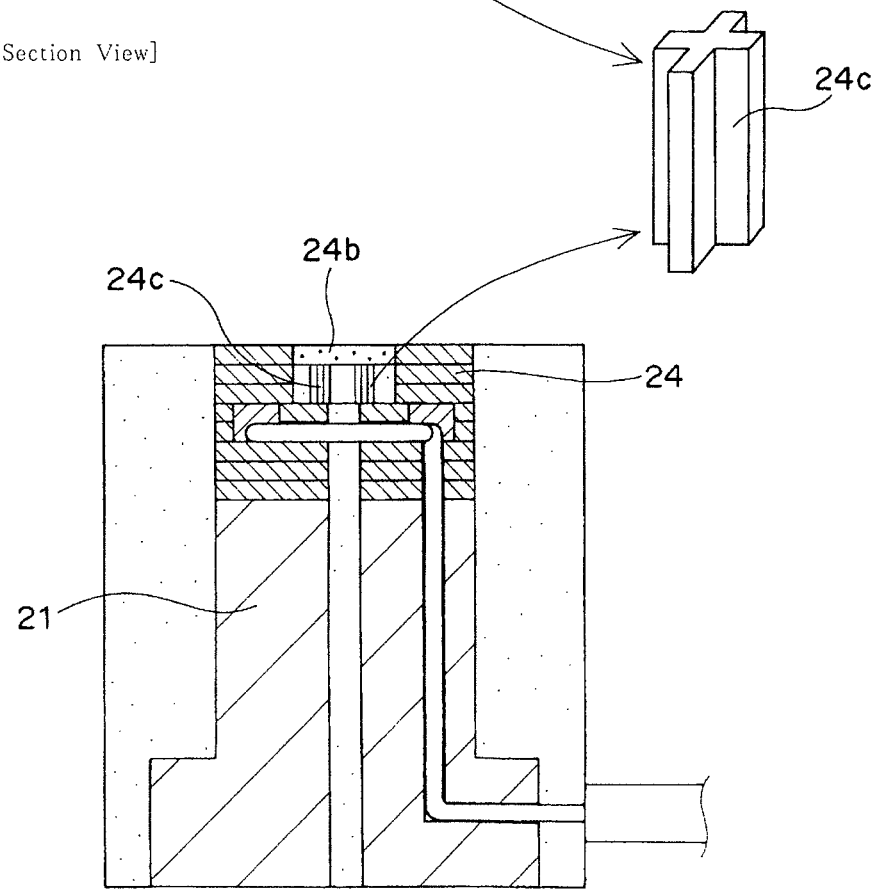
FIG. 20 schematically illustrates another embodiment of the venting part (degassing part).

FIG. 19 illustrates an embodiment of "forming process of the venting part". According to this embodiment, the porous solidified portion 24b is formed so as to allow the porous solidified portion 24b to serve as a "venting part" when the three-dimensional shaped object is used as a metal mold. The porous solidified portion 24b has the sintered density of 70% to 80%, for example. The porous solidified portion 24b can be formed by, in addition to (a) decreasing the output energy of the light beam, (b) increasing a scanning rate of the light beam, (c) enlarging a scanning pitch of the light beam, and (d) increasing a condensing diameter of the light beam. The aforementioned operations (a) to (d) may be performed alone, or performed in combination. Especially with respect to the aforementioned operation (a) for example, the porous solidified portion 24b whose sintered density is about 70% to about 80% can be formed by adjusting an irradiation energy density E of the light beam in a range from about 2 J/mm$^2$ to about 3 J/mm$^2$ The porous solidified portion 24b may be formed adjacent to the coil heater. For example, the porous solidified portion 24b may be located at the inner side of the heat generation portion 70a of the coil heater as illustrated in FIG. 19. Further, as illustrated in FIG. 20, in a case where a relatively thin porous solidified portion 24b is formed, "reinforcing beam members 24c" may be formed on a bottom side thereof so as to support such thin porous solidified portion 24b. It should be recognized that the porous solidified portion 24b is preferably located in a particular region where the raw resin material finally reaches during the resin molding process, e.g., located in proximity a cavity region at which two flows of the resin materials meet together (when the three-dimensional shaped object is used as the metal mold), in which case the porous solidified portion 24b can suitably serve as a venting part (degassing part).

In the three-dimensional shaped object in which the heater element is installed as well as the porous solidified portion 24b is provided, a local heating and a venting from the inside of the cavity can be performed during the molding process, so that the weld phenomenon can be more effectively prevented from occurring.

(Embodiment of Forming Process of Cooling Pipe)

Figure 21:
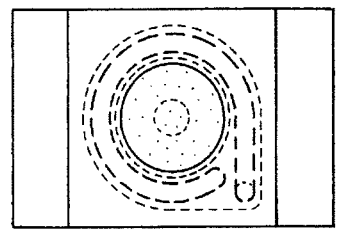
FIG. 21 schematically illustrates an embodiment of a cooling pipe.
Figure 21:
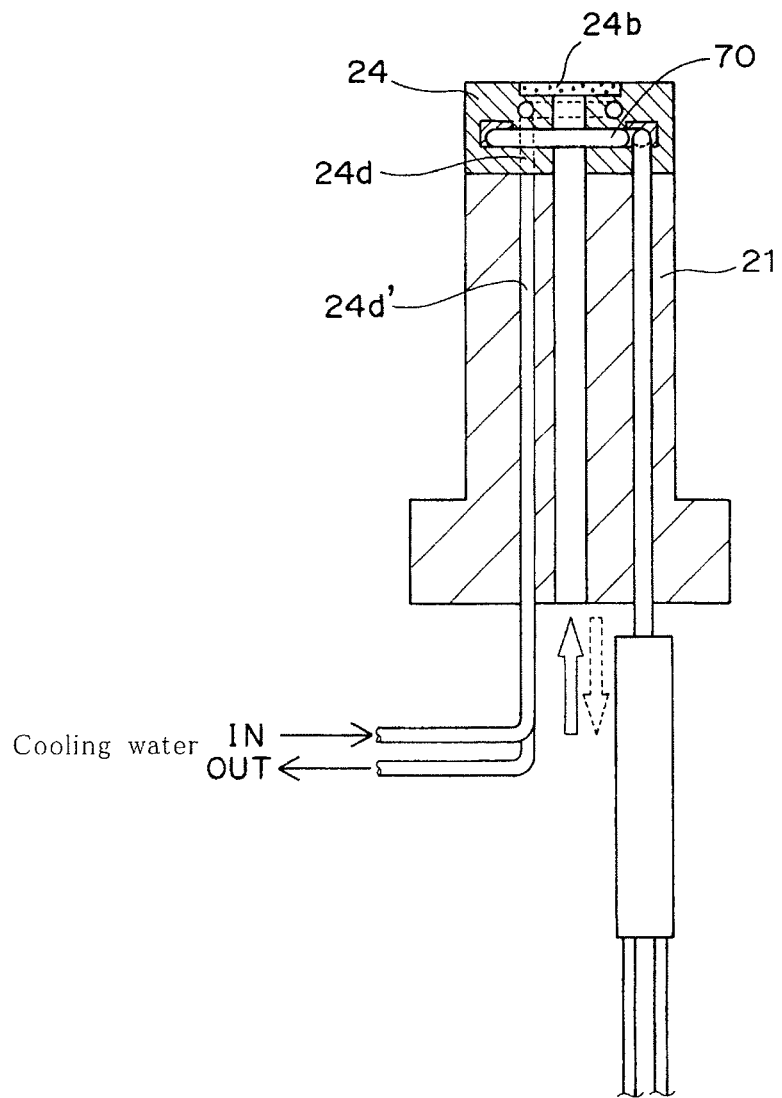
Figure 22:
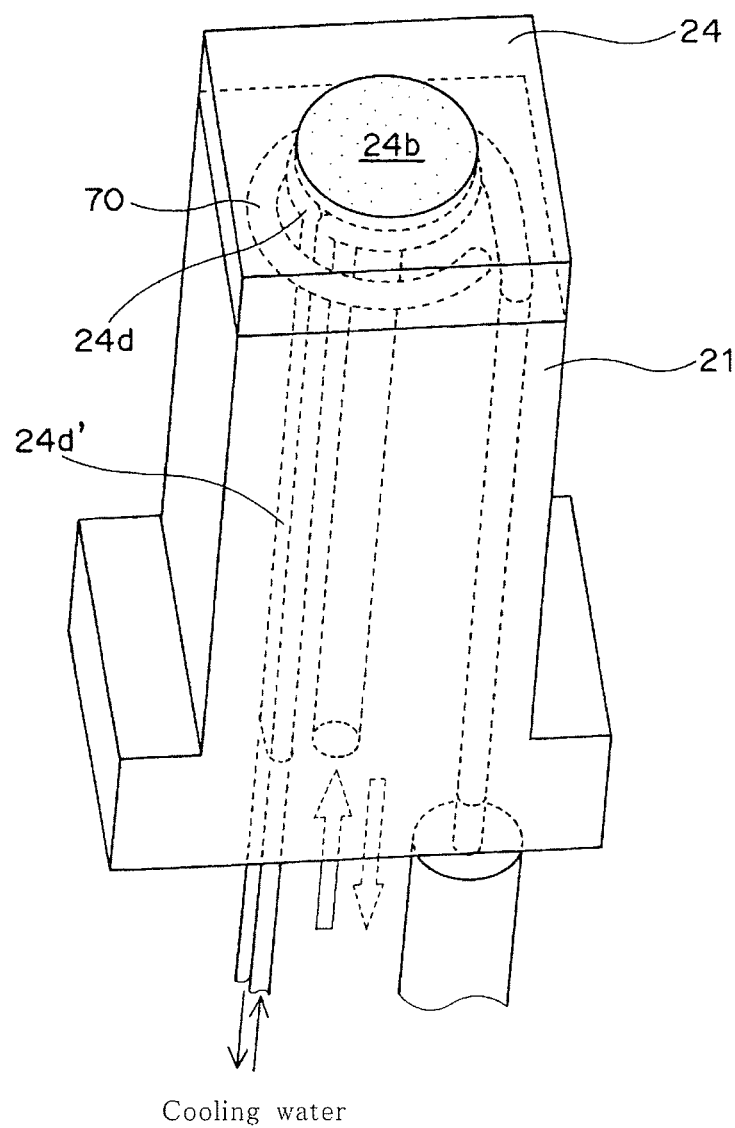
FIG. 22 schematically illustrates an embodiment of a cooling pipe.

FIGS. 21 and 22 illustrate an embodiment of "forming process of the cooling pipe", respectively. According to this embodiment, a pipe-shaped path 24d is formed in the shaped object so that a "coolant" can be flowed therethrough when the three-dimensional shaped object is used as a metal mold. The pipe-shaped path 24d can be formed through dividing a powder portion into a sub-portion where the light beam irradiation is performed and another sub-portion where no light beam irradiation is performed when the sintered layer 24 is formed. In other words, a powder region corresponding to the pipe-shaped path 24d in the metal powder layer 22 is not irradiated with the light beam but is left as it is and thereafter the powder remaining in such region is finally removed to form a hollow space serving as the pipe-shaped path 24d. In a case where the shaped object 24 integrated with the supporting part for shaped object 21 is used as the metal mold, it is preferred that a pipe-shaped path 24d' is also provided in the supporting part 21, as illustrated in FIGS. 21 and 22.

When the pipe-shaped path 24d is formed in addition to the installment of the heater element, a more effective temperature adjustment of the metal mold can be achieved. For example, the weld phenomenon can be prevented from occurring as well as the cooling treatment upon the molding process can be suitably performed. In FIGS. 21 and 22, the porous solidified portion 24b is also provided together with the heater element and the pipe-shaped path 24d. With this configuration as shown in FIGS. 21 and 22, the local heating and the venting from the inside of the cavity can be performed upon the molding process to effectively prevent the occurring of the weld, while effectively performing the subsequent cooling process.

[Three-Dimensional Shaped Object of the Present Invention]

The three-dimensional shaped object of the present invention obtained by the above described manufacturing method will be described below. The three-dimensional shaped object of the present invention has the built-in heater element therein such that it is used as the metal mold of a core side or a cavity side. In particular, the heater element is locally included within the metal mold of the present invention, and thereby a cavity-forming surface near the heater element in the metal mold can be effectively heated. The heater element can be built in the three-dimensional shaped object of the present invention in various ways. The typical examples thereof will be described in detail below:

(Embodiment of Built-in Heater Element Near Weld Line Region/Final Filling Region)

According to this embodiment, the heater element is built-in near a position at which the raw resin material finally reaches during the resin molding process (i.e., near the final filling position/the weld line occurring position). In other words, the heater element is located in proximity to the region at which the raw resin material which is introduced into the cavity finally reaches. The phrase " . . . heater element is located in proximity to . . . " as used herein means that the heater element is positioned away from the target region by a distance of about 0.5 mm to about 20 mm.

According to this embodiment, the region at which the raw resin finally reaches during the resin molding process (e.g., the cavity region at which two flows of the resin materials meet together) can be locally heated. As a result thereof, the weld phenomenon can be effectively prevented from occurring.

In more preferred embodiment of the metal mold of the present invention, the porous solidified portion 24b for venting (see, FIGS. 21 and 22) is also located adjacent to the heater element. This makes it possible to more effectively prevent the weld phenomenon from occurring.

(Embodiment of Built-In Heater Element Near Thin-Wall Molding Portion)

According to this embodiment, the heater element is built in near a cavity region where a thin part of the molded article is positioned. Generally, "cavity region where a thin part of the molded article is formed" is a portion through which the raw resin is hard to flow. In the metal mold of the present invention, the heater element is located in proximity to such region. Therefore, such region can be locally heated so that a fluidity of the raw resin is improved. This means that the raw resin material can be suitably supplied even in the thinner cavity portion. With the metal mold having the above configuration, a molded article with a desired thinner thickness can be obtained.

The term "thin part" as used herein substantially means a thickness ranging from about 0.05 mm to about 0.5 mm. Since such thin thickness of the molded article can be achieved, the three-dimensional shaped object of the present invention can be suitably used as a metal mold for molding, for example, a metal mold for electronic equipment connectors.

Even in this embodiment, it is preferred that the porous solidified portion 24b for venting is located adjacent to the heater element 70 in order to effectively prevent the weld phenomenon from occurring.

(Embodiment of Built-In Heater Element Near Gate Portion)

According to this embodiment, the heater element is built in near a gate portion of the metal mold. The gate portion is typically provided in a narrow form wherein the raw resin material tends to be readily solidified. According to the metal mold of the present invention, the heater element is located in proximity to the gate portion, i.e., the narrow region of the metal mold. Accordingly, such narrow region can be locally heated. This means the raw resin material in the gate portion is prevented from being solidified, which leads to an improvement of the resin filling. With the metal mold having such configuration, a high density molded article can be suitably obtained.

Now, use of the three-dimensional shaped object of the present invention as the metal mold will be described below. Specifically, as illustrated in FIGS. 21 and 22, the three-dimensional shaped object (i.e., metal mold) equipped with the "porous solidified portion for degassing 24b" and the "pipe-shaped path for coolant 24d" in addition to the "heater element 70" is assumed to be used here.

Upon the resin molding process in which the metal mold obtained by the present invention is used, it is preferred that "ON/OFF timing of a heating operation by the heater element", "timing of gas suction or gas blowout via the porous solidified portion 24b" and/or "timing of coolant flow via the pipe-shaped path 24d" are respectively controlled. For example, it is preferable to conduct a control as illustrated in FIG. 23. With such a control, the molded article can be suitably obtained with no occurring of the weld. It should be recognized that, if gas is blown out via the porous solidified portion 24b upon the opening operation of the metal mold/taking-out operation of the metal mold, a undesirable clogging of the portion 24b can be prevented.

Although a few embodiments of the present invention have been hereinbefore described, the present invention is not limited to these embodiments. It will be readily appreciated by those skilled in the art that various modifications are possible without departing from the scope of the present invention.

It should be noted that the present invention as described above includes the following aspects:

The first aspect: A method for manufacturing a three-dimensional shaped object, the method comprising the repeated steps of:

(i) forming a solidified layer by irradiating a predetermined portion of a powder layer with a light beam, thereby allowing a sintering of the powder in the predetermined portion or a melting and subsequent solidification thereof; and (ii) forming another solidified layer by newly forming a powder layer on the resulting solidified layer, followed by the irradiation of a predetermined portion of the powder layer with the light beam, wherein a heater element is disposed on the solidified layer during the repeated steps (i) and (ii), and thereby the heater element is situated within the three-dimensional shaped object.

The second aspect: The method according to the first aspect, wherein the forming of the powder layer and the solidified layer in the steps (i) and (ii) is performed on a supporting part for shaped object; and a coil heater is used as the heater element, and the coil heater is disposed on the solidified layer via an opening of the supporting part.

The third aspect: The method according to the first or second aspect, wherein the heater element is disposed in a groove formed in stacked layers of the solidified layers.

The fourth aspect: The method according to the third aspect wherein the groove is subjected to a machining process, and the heater element is disposed on the machined surface of the groove.

The fifth aspect: The method according to the third or fourth aspect, further comprising the step of filling the groove with a low-melting-point metal powder after disposing the heater element in the groove, wherein the low-melting-point metal powder is irradiated with the light beam, and thereby the groove is occupied by a solidified portion formed from the low-melting-point metal powder.

The sixth aspect: The method according to the fifth aspect, wherein the irradiation of the low-melting-point metal powder is performed with a light beam having less energy than that of the light beam irradiation with respect to the powder layer.

The seventh aspect: The method according to the sixth aspect, wherein an irradiation energy of the light beam with respect to the low-melting-point metal powder is rendered larger gradually as a powder portion to be irradiated is away from the heater element.

The eighth aspect: The method according to any one of the fifth to seventh aspects, wherein, after the formation of the solidified portion, the machining process is performed with respect to the solidified portion and/or the solidified layer, and thereby a surface flatness thereof is provided.

The ninth aspect: A three-dimensional shaped object obtained by the method according to any one of the first to eighth aspects, wherein the three-dimensional shaped object has a built-in heater element therewithin such that it is used as a metal mold.

The tenth aspect: The three-dimensional shaped object according to the ninth aspect, wherein the built-in heater element is located in proximity to a cavity region where a raw resin material which is introduced into a cavity of the metal mold finally reaches.

The eleventh aspect: The three-dimensional shaped object according to the ninth aspect, wherein the built-in heater element is located in proximity to a cavity region where a thin molded portion formed in the metal mold is positioned.

The twelfth aspect: The three-dimensional shaped object according to any one of the ninth to eleventh aspects, wherein the built-in heater element is located in proximity to a gate portion of the metal mold.

Industrial Applicability

The produced three-dimensional shaped object obtained by the manufacturing method of the present invention can be used as various industrial articles. For example, the three-dimensional shaped object can be used as a metal mold for a plastic injection molding, a press molding, a die casting, a casting or a forging.

CROSS REFERENCE TO RELATED PATENT APPLICATION

The present application claims the right of priority of Japanese Patent Application No. 2010-132209 (filed on Jun. 9, 2010, the title of the invention: "METHOD FOR MANUFACTURING THREE-DIMENSIONAL SHAPED OBJECT AND THREE-DIMENSIONAL SHAPED OBJECT OBTAINED THEREBY"), the disclosure of which is incorporated herein by reference.

The invention claimed is:

1. A method for manufacturing a three-dimensional shaped object, the method comprising the repeated steps of:
 (i) forming a solidified layer by irradiating a predetermined portion of a powder layer with a light beam, thereby allowing a sintering of the powder in the predetermined portion or a melting and subsequent solidification thereof; and
 (ii) forming another solidified layer by newly forming a powder layer on the resulting solidified layer, followed by the irradiation of a predetermined portion of the powder layer with the light beam,
 wherein a heater element is disposed on the solidified layer during the repeated steps (i) and (ii), and thereby the heater element is situated within the three-dimensional shaped object,
 wherein the forming of the powder layer and the solidified layer in the steps (i) and (ii) is performed on a supporting part for shaped object; and
 a coil heater is used as the heater element, and the coil heater is disposed on the solidified layer via an opening of the supporting part.

2. The method according to claim 1, wherein the heater element is disposed in a groove formed in stacked layers of the solidified layers.

3. The method according to claim 2, wherein the groove is subjected to a machining process, and the heater element is disposed on the machined surface of the groove.

4. The method according to claim 2, further comprising the step of filling the groove with a low-melting-point metal powder after disposing the heater element in the groove, wherein the low-melting-point metal powder is irradiated with the light beam, and thereby the groove is occupied by a solidified portion formed from the low-melting-point metal powder.

5. The method according to claim 4, wherein the irradiation of the low-melting-point metal powder is performed with a light beam having less energy than that of the light beam irradiation with respect to the powder layer.

6. The method according to claim 5, wherein an irradiation energy of the light beam with respect to the low-melting-point metal powder is rendered larger gradually as a powder portion to be irradiated is away from the heater element.

7. The method according to claim 4, wherein, after the formation of the solidified portion, the machining process is performed with respect to the solidified portion and/or the solidified layer, and thereby a surface flatness thereof is provided.

* * * * *